(12) United States Patent
Vite Cadena et al.

(10) Patent No.: US 11,780,374 B2
(45) Date of Patent: Oct. 10, 2023

(54) VEHICLE MOBILE DEVICE HOLDER ASSEMBLY

(71) Applicant: Nissan North America, Inc., Franklin, TN (US)

(72) Inventors: Manuel Alejandro Vite Cadena, Farmington Hills, MI (US); Matthew Cole, Franklin, TN (US)

(73) Assignee: Nissan North America, Inc., Franklin, TN (US)

( * ) Notice: Subject to any disclaimer, the term of this patent is extended or adjusted under 35 U.S.C. 154(b) by 160 days.

(21) Appl. No.: 16/936,243

(22) Filed: Jul. 22, 2020

(65) Prior Publication Data

US 2022/0024387 A1  Jan. 27, 2022

(51) Int. Cl.
*B60R 7/04* (2006.01)

(52) U.S. Cl.
CPC ..................... *B60R 7/04* (2013.01)

(58) Field of Classification Search
CPC . B60R 11/02; B60R 11/0229; B60R 11/0235; B60R 11/0252; B60R 11/0258; B60R 11/0294; B60R 11/0241; B60R 2011/0007
USPC ................................................ 224/542, 544
See application file for complete search history.

(56) References Cited

U.S. PATENT DOCUMENTS

| | | | | |
|---|---|---|---|---|
| 5,100,091 A | * | 3/1992 | Pollak | A61G 5/10 |
| | | | | 248/278.1 |
| 6,246,766 B1 | * | 6/2001 | Walsh | H04M 1/04 |
| | | | | 379/426 |
| D651,473 S | * | 1/2012 | Cribb | D7/619.1 |
| 9,162,630 B2 | * | 10/2015 | Pluta | B60R 11/02 |
| 9,819,211 B2 | | 11/2017 | Vu et al. | |
| D824,838 S | * | 8/2018 | Takamura | D12/419 |
| 10,576,905 B1 | * | 3/2020 | MacNeil | H04B 1/3888 |
| 2003/0128840 A1 | | 7/2003 | Luginbill et al. | |
| 2007/0284500 A1 | * | 12/2007 | Fan | B60R 11/0241 |
| | | | | 248/346.06 |
| 2008/0019082 A1 | * | 1/2008 | Krieger | H01Q 1/081 |
| | | | | 343/702 |
| 2010/0294818 A1 | | 11/2010 | La Fargue et al. | |
| 2016/0311378 A1 | | 10/2016 | La Fargue et al. | |
| 2018/0001835 A1 | * | 1/2018 | Corso | B60N 3/103 |
| 2019/0092243 A1 | | 3/2019 | Perez et al. | |
| 2020/0101886 A1 | | 4/2020 | Shibata et al. | |

* cited by examiner

*Primary Examiner* — Scott T McNurlen
(74) *Attorney, Agent, or Firm* — Global IP Counselors, LLP

(57) ABSTRACT

A vehicle mobile device holder assembly includes a base, a first articulating section and a second articulating section. The base is shaped and dimensioned to fit within a beverage container recess of a center console of a passenger vehicle. The base has an open central area dimension and shaped to receive a beverage container. The base further includes an attachment portion. The first articulating section is attached to attachment portion of the base. The second articulating section is attached to the first articulating section and has a mobile device retaining section.

9 Claims, 18 Drawing Sheets

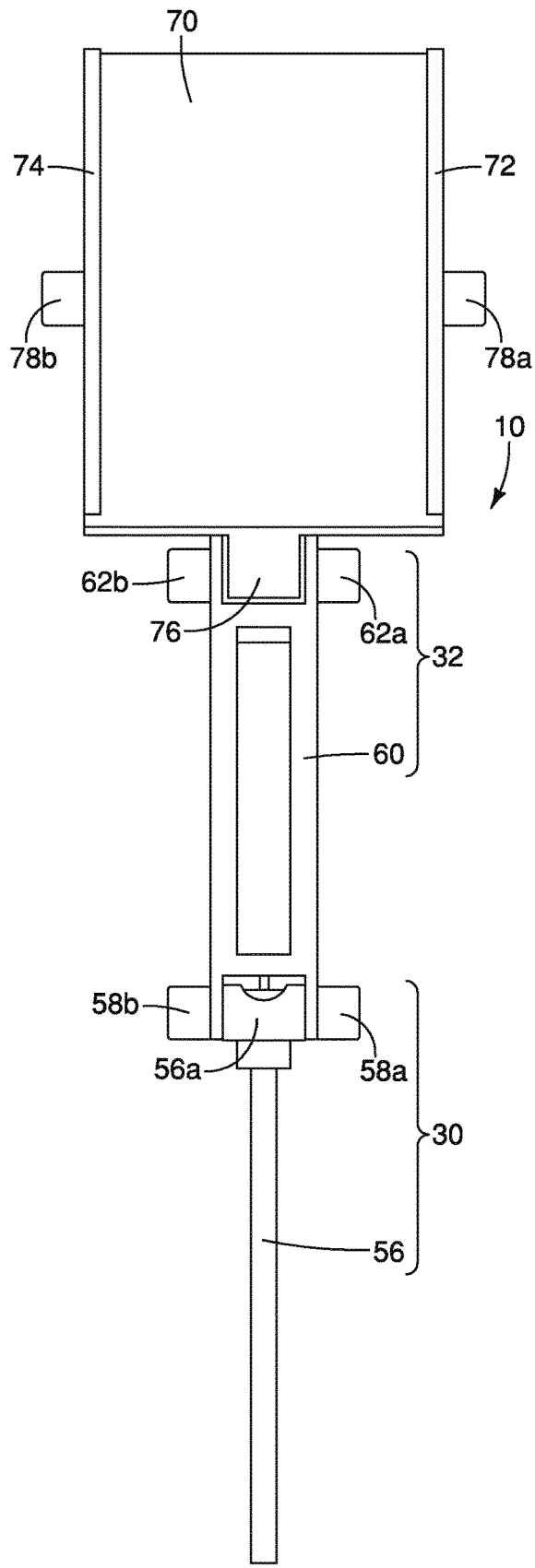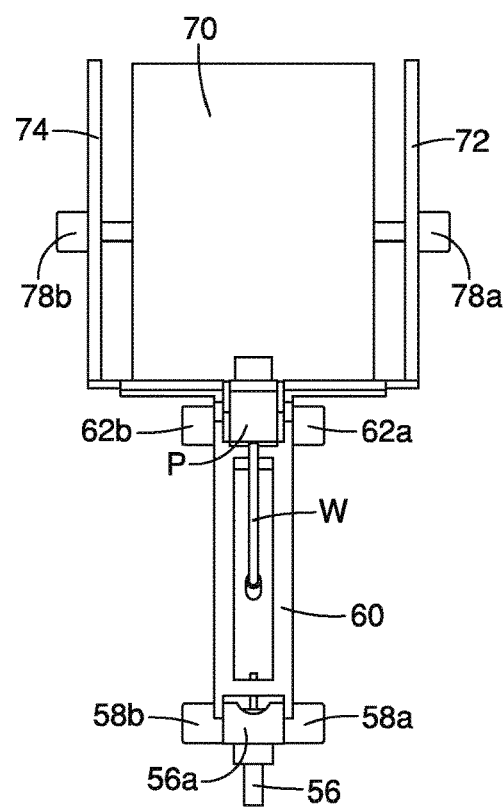
FIG. 6
FIG. 7

US 11,780,374 B2

VEHICLE MOBILE DEVICE HOLDER ASSEMBLY

BACKGROUND

Field of the Invention

The present invention generally relates to a vehicle mobile device holder assembly. More specifically, the present invention relates to a vehicle mobile device holder assembly that is installed within a beverage container recess of a vehicle center console and is dimensioned and shaped to receive a beverage container.

Background Information

Center consoles of vehicle typically include a beverage container recess (also referred to as a cup holder). There are various mobile device holders for vehicles that install to the beverage container recess but are dimensioned such that the beverage container recess can no longer receive a beverage container or cup.

SUMMARY

One object of the present disclosure is to provide a mobile device holder assembly with a base that fits into a beverage container recess of a vehicle center console and has an open central area dimension and shaped to receive a beverage container.

In view of the state of the known technology, one aspect of the present disclosure is to provide a vehicle mobile device holder assembly with a base, a first articulating section and a second articulating section. The base is shaped and dimensioned to fit within a beverage container recess of a center console of a passenger vehicle. The base has an open central area dimension and shaped to receive a beverage container. The base further includes an attachment portion. The first articulating section is attached to attachment portion of the base. The second articulating section is attached to the first articulating section and has a mobile device retaining section.

BRIEF DESCRIPTION OF THE DRAWINGS

Referring now to the attached drawings which form a part of this original disclosure:

FIG. 6 is a rear view of the vehicle mobile device holder assembly with the base removed in accordance with the first embodiment;

FIG. 7 is a front view of the vehicle mobile device holder assembly with the base removed in accordance with the first embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
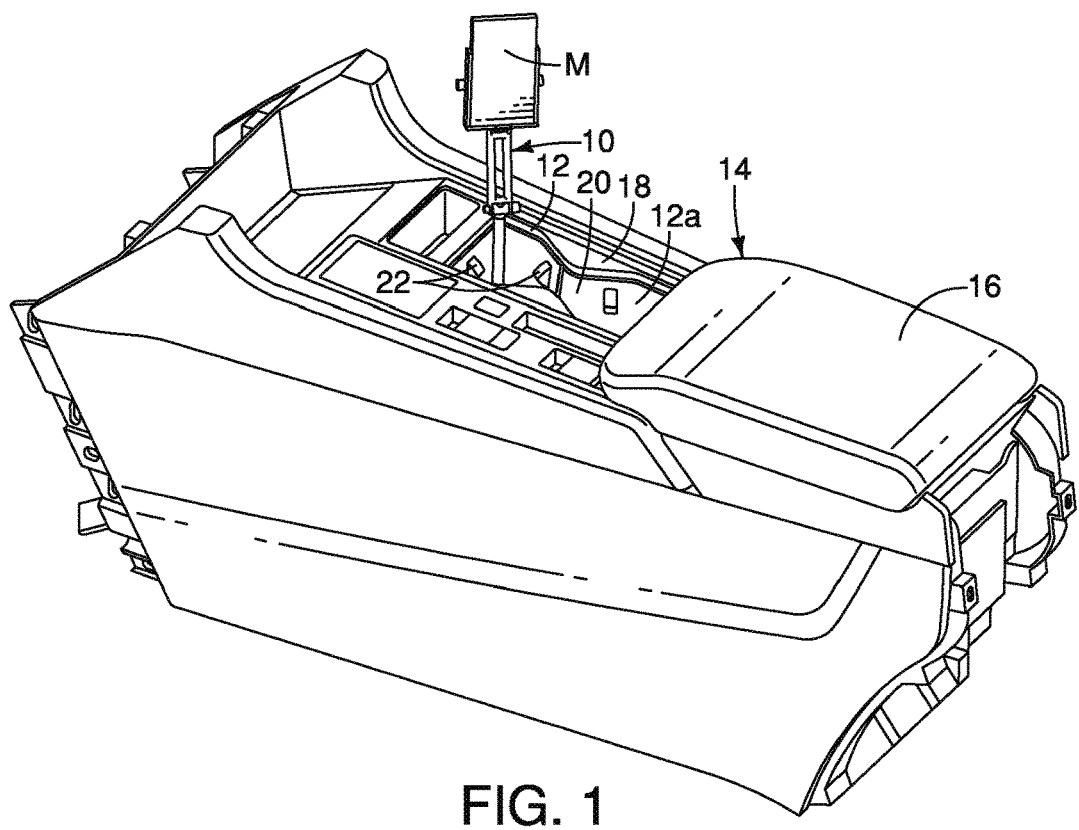
FIG. 1 is a perspective view of a center console removed from a vehicle showing a vehicle mobile device holder assembly installed within a beverage container recess of the center console in accordance with a first embodiment.
Figure 2:
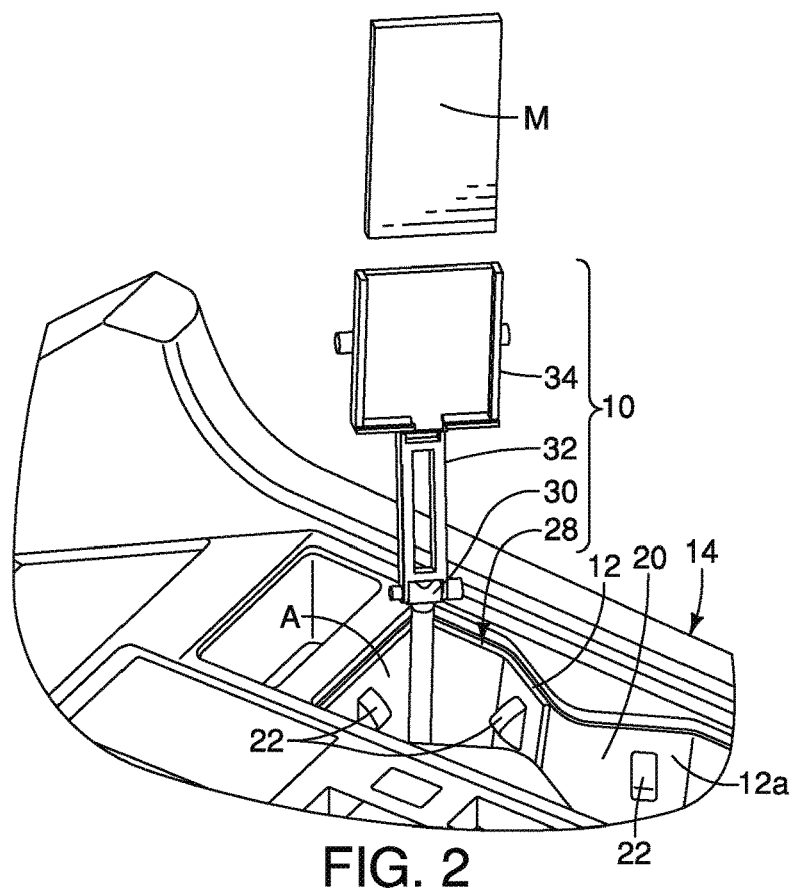
FIG. 2 is a second perspective view showing a portion of the center console depicted in FIG. 1, showing the vehicle mobile device holder assembly installed within the beverage container recess of the center console in accordance with the first embodiment.

Referring initially to FIG. 1, a vehicle mobile device holder assembly 10 installed to a beverage container recess 12 (also referred to as a cupholder 12) of a vehicle center console assembly 14 is illustrated in accordance with a first embodiment.

Figure 5:
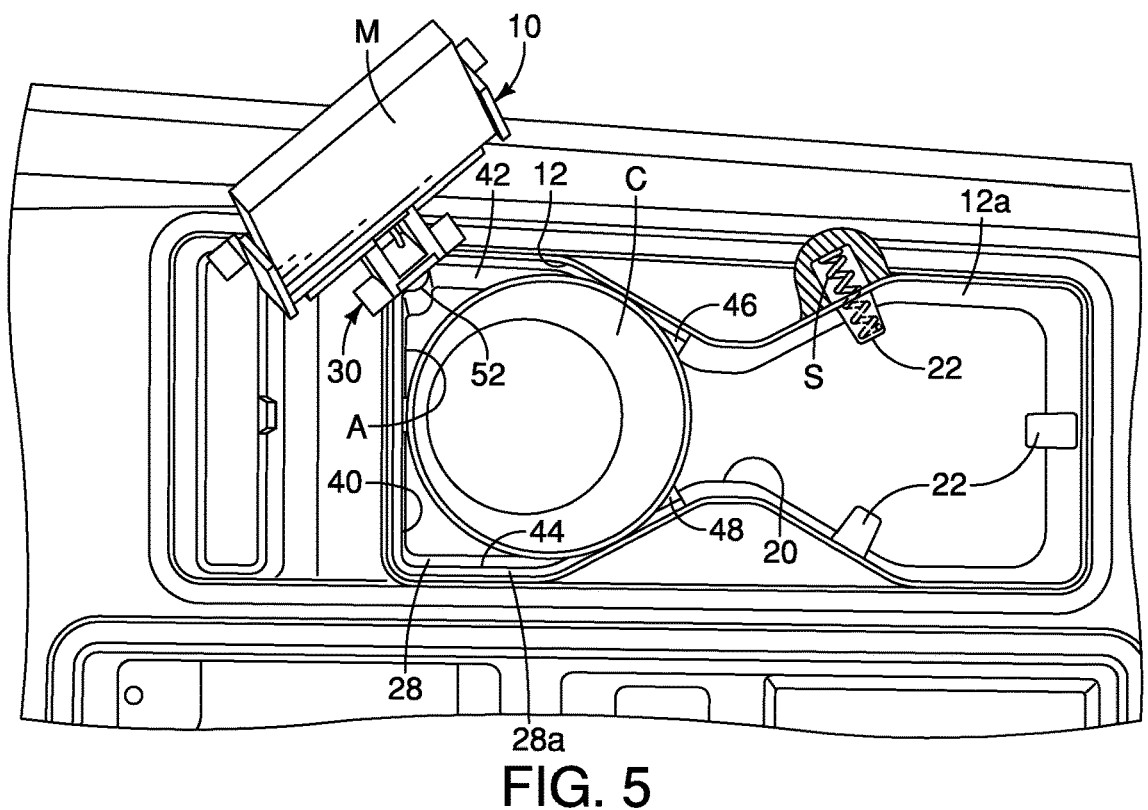
FIG. 5 is a top view of the center console showing the vehicle mobile device holder assembly installed to a beverage container recess of the center console in accordance with the first embodiment.
Figure 13:
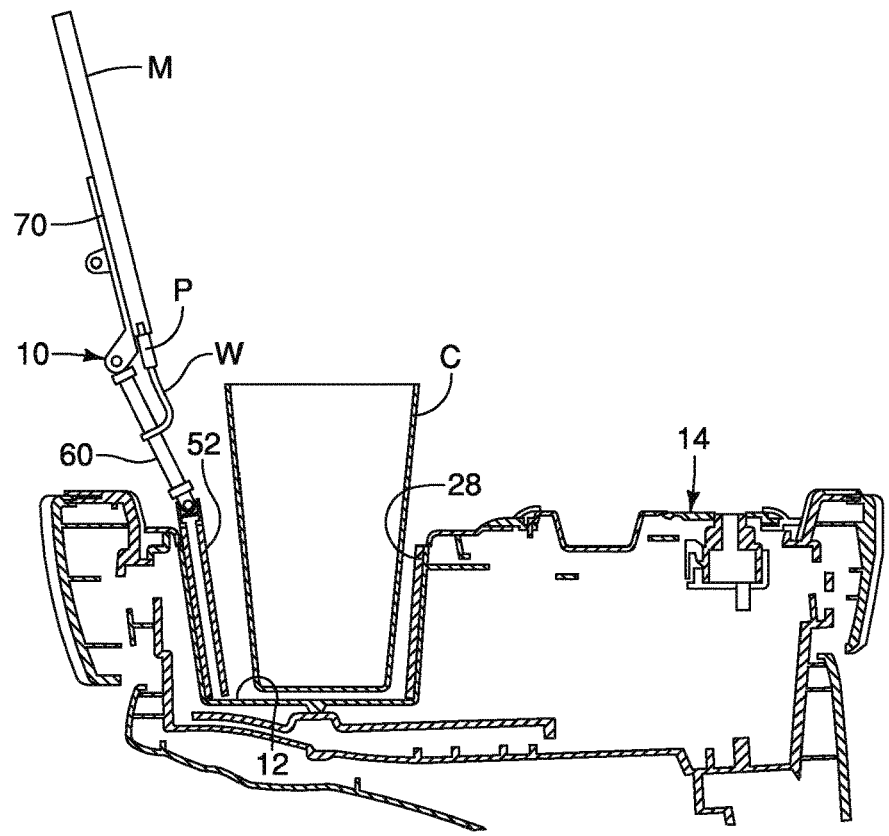
FIG. 13 is a cross-sectional view of the center console and vehicle mobile device holder assembly with a beverage container placed within the base and the beverage container recess of the center console in accordance with the first embodiment.
Figure 14:
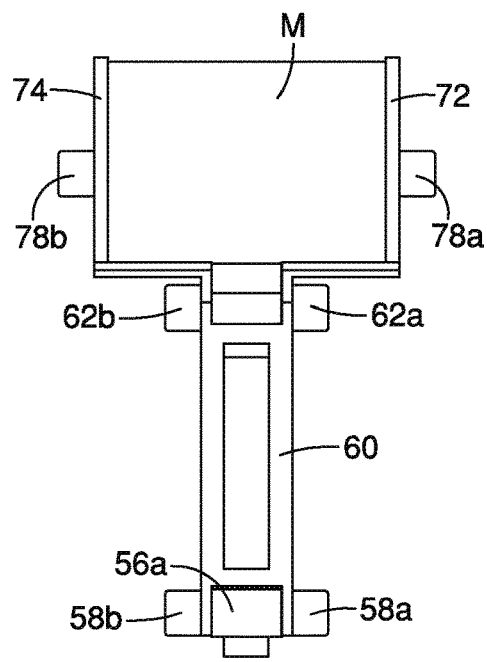
FIG. 14 is a front view of the first and second articulating sections and the mobile device retaining section showing a gap between sections of the beam of the second articulating section in accordance with the first embodiment.

First, a brief description of one example of the vehicle center console assembly 14 (also referred to as a center console 14). As shown in FIGS. 1-3 and 5, the center console 14 is a box-like structure that is fixed to a central area of a floor of a vehicle (not shown) between a pair of front seats (not shown) within a vehicle passenger compartment (not shown). The center console 14 has at least one storage compartment 16, a beverage container recess 12 and a beverage container recess 12a. The beverage container recess 12 and the beverage container recess 12a are basically recesses formed in an upper surface 18 of the center console 14 forward of the storage compartment 16. Each of the beverage container recess 12 and the beverage container recess 12a is shaped and contoured to receive a cup or beverage C, as shown in FIGS. 5 and 13. The beverage container recess 12 is separate and spaced apart from the beverage container recess 12a.

However, in some center console designs, such as in the first embodiment, an open space 20 is defined between the beverage container recess 12 and the beverage container recess 12a. The beverage container recess 12 and the beverage container recess 12a are each designed with a predetermined depth. The depth of the open space 20 can be the same as the beverage container recess 12 and/or the beverage container recess 12a. Alternatively, the open space 20 can be slightly shallower that the beverage container recess 12 and the beverage container recess 12a. In other words, the depth of the beverage container recess 12 can have a first depth $D_1$, the beverage container recess 12a can have a second depth $D_2$ and the open space 20 can have a third depth $D_3$ relative to the upper surface 18. The first depth $D_1$ can be greater or equal to the second depth $D_2$. The third depth $D_3$ can be less than or equal to the second depth $D_2$, depending upon the overall design of the center console 14.

Further some beverage container recesses of center console designs, such as the beverage container recesses 12 and 12a of the center console 14 of the first embodiment, include spring loaded members 22. The spring-loaded members 22 are movable structures that are spring biased by springs S to move toward the center of the beverage container recesses 12 and 12a, as shown in FIG. 5. The spring loaded members 22 can be shaped and dimensioned to pivot about an upper or a lower pivot axes (not shown) or can be positioned within opening in the surfaces that define the beverage container recesses 12 and 12a such that they are restrained against further movement into the beverage container recesses 12 and 12a than is shown in, for example, FIGS. 2 and 5. The spring loaded members 22 are easily moved by compression forces acting against the springs S to move into a pocket within the walls that define the beverage container recesses 12 and 12a so that the beverage container C can be raised out of the beverage container recesses 12 and 12a. The spring biasing of the spring S applies sufficient force against the spring loaded members 22 such that the beverage container C is gently held within one of the beverage container recesses 12 and 12a, thereby limiting movement of the beverage container C regardless of the beverage container C is the same size, shape and/or diameter of the beverage container C. Since such spring-loaded members 22 are conventional structures, further description is omitted for the sake of brevity.

A description is now provided of the vehicle mobile device holder assembly 10 (hereinafter referred to as the holder assembly 10) with specific reference to FIGS. 2-20.

The holder assembly 10 basically includes a base 28, a first articulating section 30, a second articulating section 32 and a mobile device retaining section 34.

As shown in FIGS. 2, 5 and 8-12, the base 28 is shaped and dimensioned to fit within a beverage container recess 12 in the center console 14. In other words, the base 28 can be shaped and dimensioned to fit within and be retained within either of the beverage container recess 12 and 12a. However, in the depicted embodiment for the sake of brevity, the base 28 is shown installed only to the beverage container recess 12.

Figure 3:
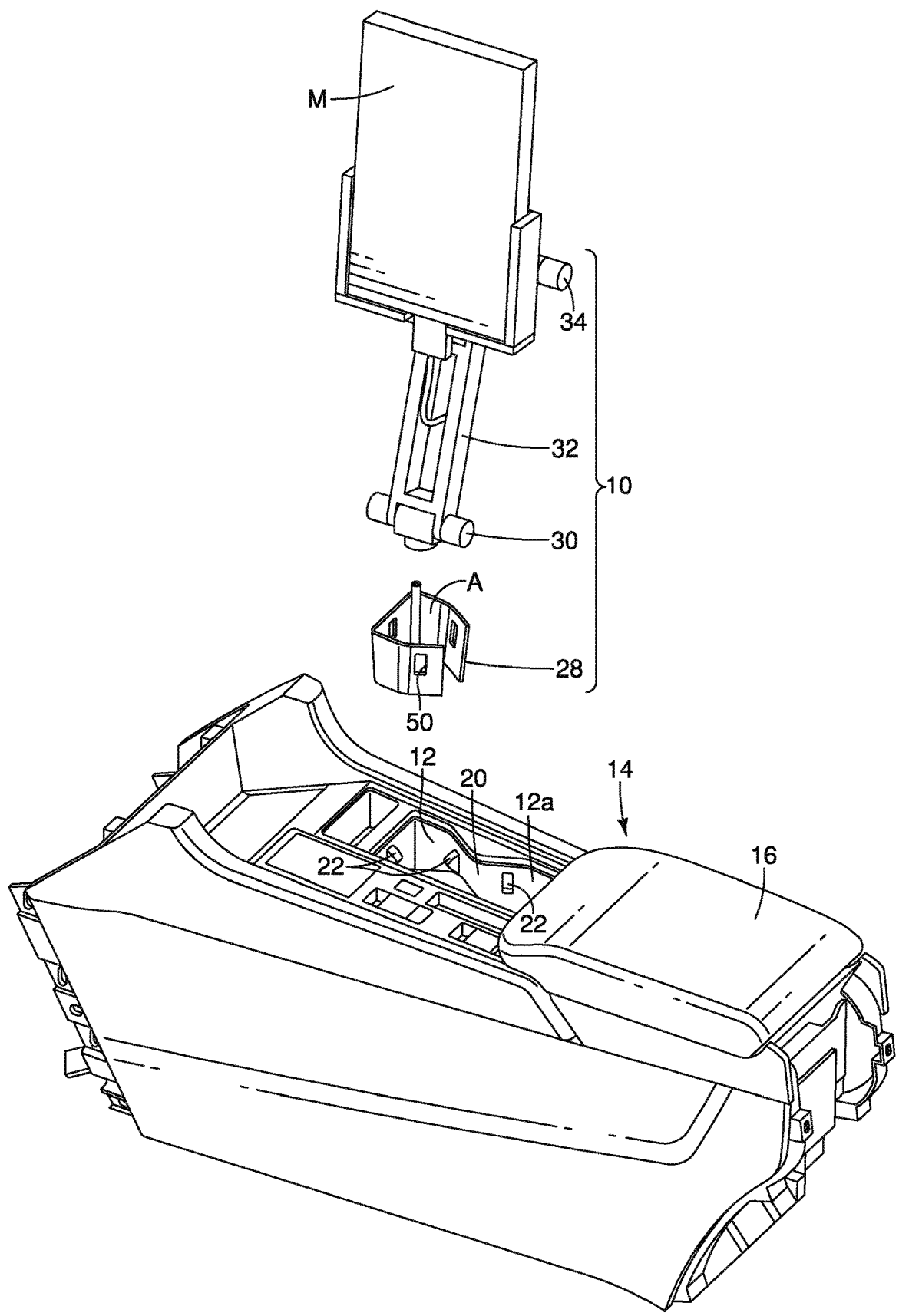
FIG. 3 is an exploded perspective view of center console and the sections of the vehicle mobile device holder assembly, showing a base, a first articulating section, a second articulating section and a mobile device retaining section of the vehicle mobile device holder assembly in accordance with the first embodiment.
Figure 4:
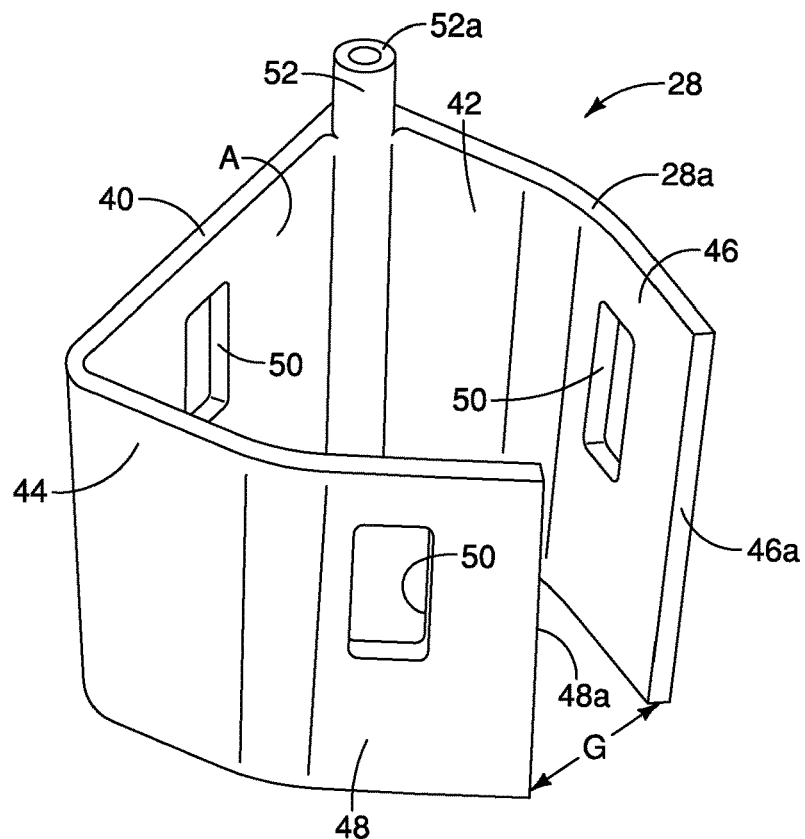
FIG. 4 is a perspective view of the base removed from the vehicle mobile device holder assembly in accordance with the first embodiment.

In the first embodiment, the beverage container recess 12 has a non-circular shape and the base 28 is shaped to conform to the non-circular shape of the beverage container recess 12. Specifically, as shown in FIGS. 3 and 4, the base 28 has a first upright wall section 40, a second upright wall section 42 and a third upright wall section 44, a fourth upright wall section 46 and a fifth upright wall section 48. The first and second upright wall sections 40 and 42 are approximately perpendicular to one another (plus or minus any value between 1 and 15 degrees), and, the first and third upright wall sections 40 and 44 are approximately perpendicular to one another (plus or minus any value between 1 and 15 degrees).

Further, the second and third upright wall sections 42 and 44 are approximately parallel to one another (plus or minus any value between 1 and 30 degrees).

The fourth upright wall section 46 extends away from the second upright wall section 42 defining an obtuse angle therebetween. Similarly, the fifth upright wall section 48 extends away from the third upright wall section 44 defining an obtuse angle therebetween. As shown in FIG. 4, the fourth upright wall section 46 defines an upright edge 46a (a free distal end) and the fifth upright wall section 48 defines or upright edge 48a (a free distal end). Further, the fourth and fifth upright wall sections 46 and 48 extend in directions that converge toward one another. As well, the upright edges 46a and 48a respectively of the fourth upright wall section 46 and the fifth upright wall section 48 define a gap G therebetween such that with the base 28 installed within the beverage container recess 12 of a center console 14 of a passenger vehicle, the gap G is located at a rearward portion of the beverage container recess 12. However, if the base 28 is installed within the beverage container recess 12a of a center console 14, the gap G would be located at a forward portion of the beverage container recess 12a due to the shape and configuration of the beverage container recess 12a relative to the beverage container recess 12. As shown in FIG. 13, the beverage container C fits into the base 20 with the first, second, third, fourth and fifth upright wall sections 40, 42, 44, 46 and 48 at least partially surrounding the beverage container C.

At least one of the upright wall sections of the base 28 includes an opening 50 that is located, shaped and dimensioned to receive a corresponding the spring-loaded members 22. In the depicted first embodiment, each of the first upright wall section 40, the fourth upright wall section 46 and the fifth upright wall section 48 include one opening 50. Thus, as shown in FIGS. 2, 5 and 8-11, three of the spring-loaded members 22 extend through corresponding openings 22, retaining the base 28 within the beverage container recess 12.

The base 28 also defines an upper edge 28a that extends along each of the first upright wall section 40, the second upright wall section 42, the third upright wall section 44, the fourth upright wall section 46 and the fifth upright wall section 48, as shown in FIG. 4. In the depicted first embodiment, the entirety upper edge 28a defines and lies within a single plane. In other words, the upper edge 28a is flat and smooth, with no contours.

The base 28 also includes an attachment portion 52. In the depicted embodiment, the attachment portion 52 is located at the intersection of the first and second upright wall sections 40 and 42. The first, second, third, forth and fifth upright wall sections 40, 42, 44, 46 and 48 and the attachment portion 50 are all formed as a single, monolithic unitary element that is, for example, formed from a plastic or polymer material in a single molding process.

The attachment portion 52 of the base 28 is an elongated thickened portion of the base 28 that can optionally have an overall cylinder-like shape. The attachment portion 52 includes a bore or upright extending opening 52a that extends most if not all of the height of the attachment portion 52 and the base 28.

The first, second, third, fourth and fifth upright wall sections 40, 42, 44, 46 and 48 of the base 28 define an open central area A that is dimension and shaped to receive a beverage container such as the beverage container C, as shown in FIGS. 5 and 13.

Figure 8:
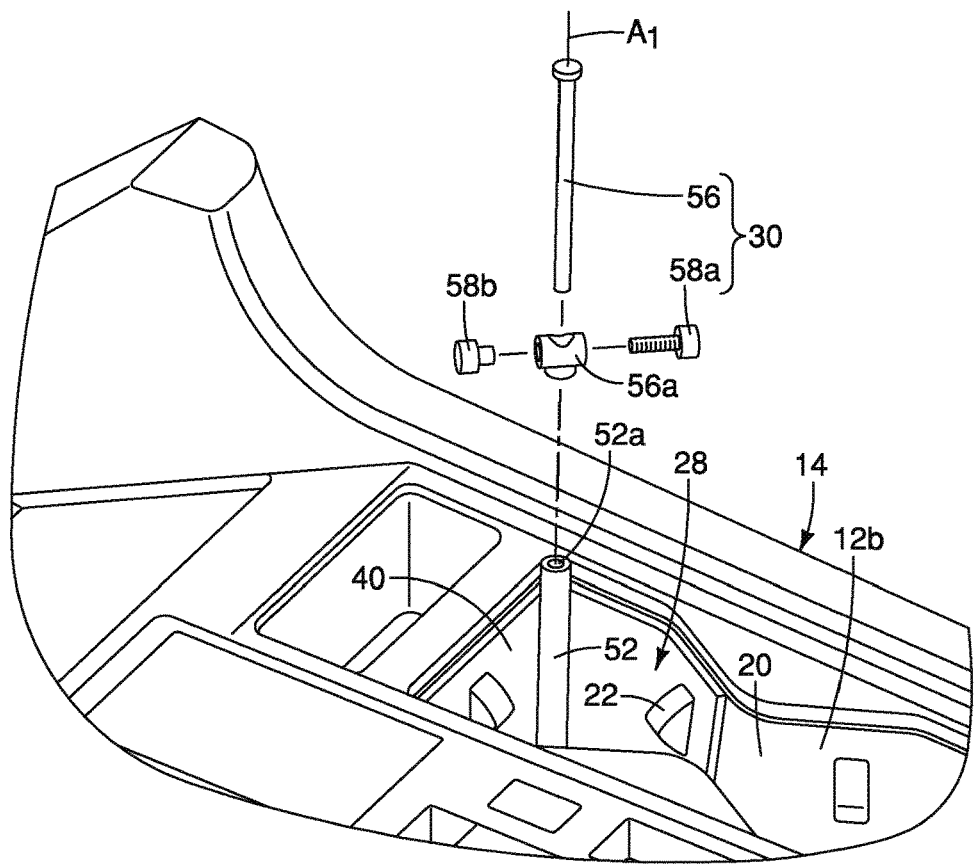
FIG. 8 is an exploded perspective view of the vehicle mobile device holder assembly looking forward with the base installed within the beverage container recess of the center console showing the first articulating section during installation to the base in accordance with the first embodiment.
Figure 9:
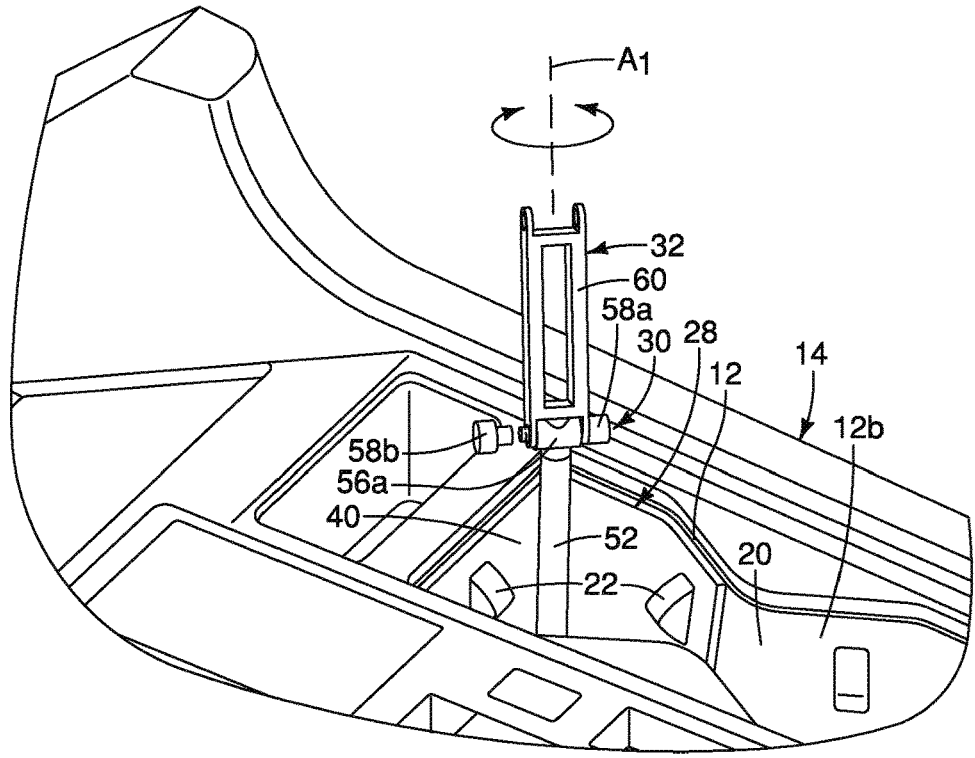
FIG. 9 is another exploded perspective view of the vehicle mobile device holder assembly similar to FIG. 8 with the base installed within the beverage container recess of the center console and the first articulating section installed to the base showing beam of the second articulating section during installation to the first articulating section in accordance with the first embodiment.
Figure 10:
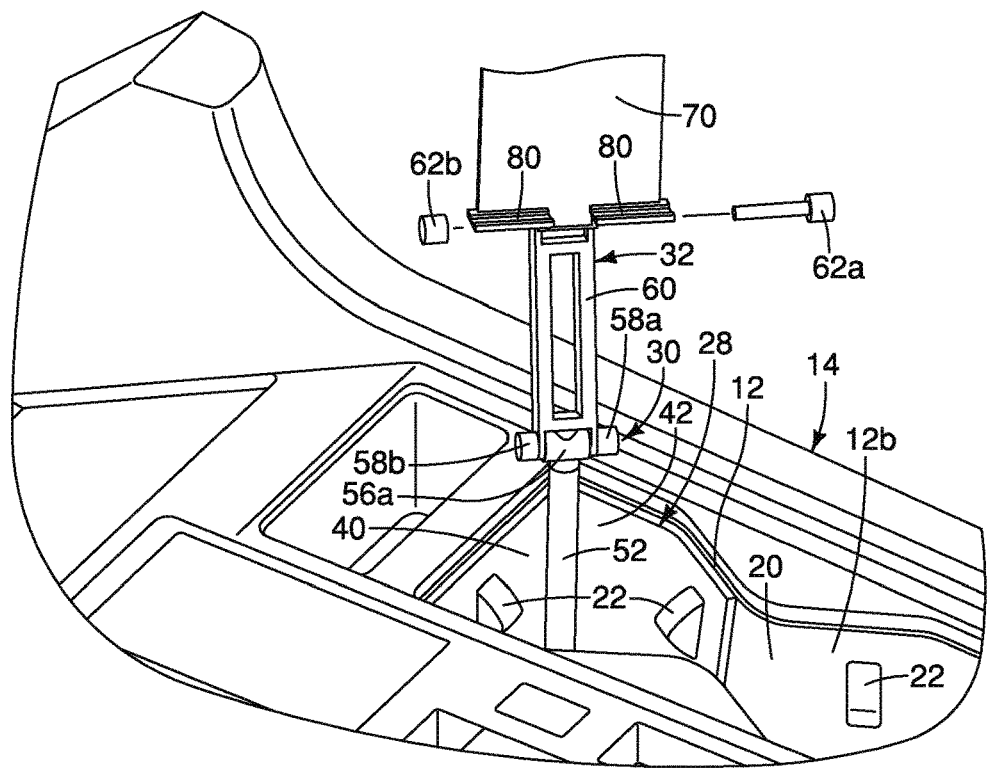
FIG. 10 is yet another exploded perspective view of the vehicle mobile device holder assembly with the base installed within the beverage container recess of the center console, the first articulating section installed to the base and showing a panel of the mobile device retaining section during installation to the beam of the second articulating section in accordance with the first embodiment.
Figure 11:
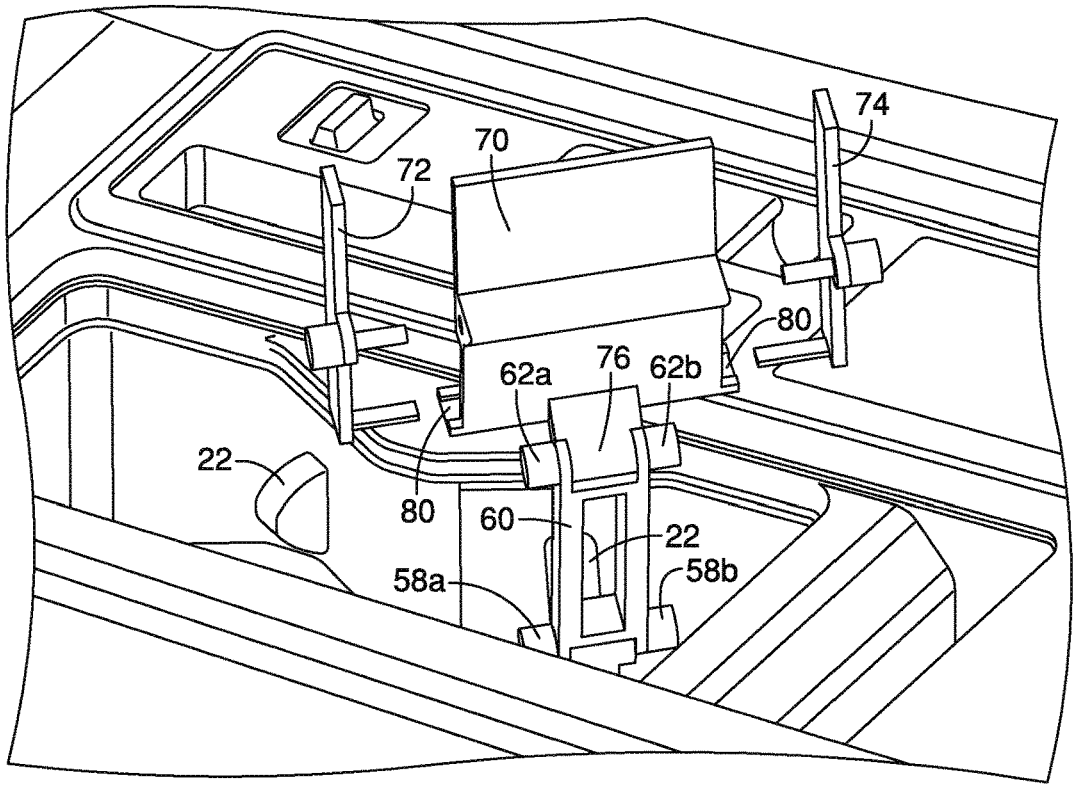
FIG. 11 is an exploded perspective view looking rearward of the vehicle mobile device holder assembly with the first articulating section installed to the base and the mobile device retaining section installed to the beam of the second articulating section and showing first and second clamping parts being installed to the panel of the mobile device retaining section in accordance with the first embodiment.
Figure 12:
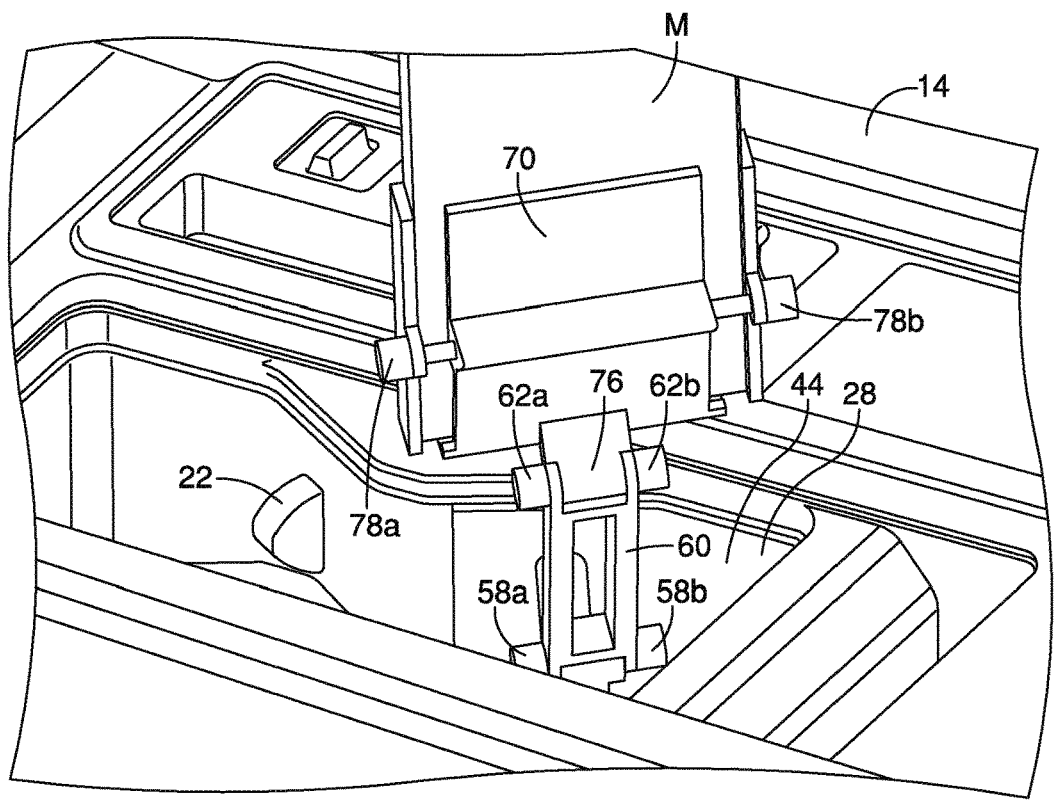
FIG. 12 is an exploded perspective view looking rearward of the vehicle mobile device holder assembly with the first articulating section installed to the base and the mobile device retaining section installed to the beam of the second articulating section and showing first and second clamping parts being installed to the panel of the mobile device retaining section in accordance with the first embodiment.

As shown in FIGS. 6-8, the first articulating section 30 of the holder assembly 10 includes an elongated pin 56 and an upper end 56a. The elongated pin 56 can be inserted through an opening of the upper end 56a, or, can be rigidly fixed to the upper end 56a. In the depicted embodiment, the upper end 56a is separate from the elongated pin 56 such that the upper end 56a can pivot about an upright axis $A_1$ defined by the elongated pin 56, as shown in FIGS. 8 and 9. The elongated pin 56 is inserted into the opening 52a such that the upper end 56a of the first articulating section 30 can pivot relative to the attachment portion 52 about the upright axis $A_1$. The elongated pin 56 can be threaded into the opening 52a or can be force fitted into the opening 52a. Preferably, the elongated pin 56 is installed to the opening 52a such that the upper end 56a can be pivoted about the axis $A_1$, but is provided with resistance to rotation such that the upper end 56a can be pivoted, but remains in position after undergoing pivotal movement.

Hence, the first articulating section 30 defines a pivot structure (the upper end 56a) that is retained by the elongated pin 56 such that the upper end 56a of the first articulating section 30 pivots about the vertical or upright axis $A_1$.

The upper end 56a further includes horizontally oriented openings that are dimensioned to receive fasteners 58a and 58b.

Figure 16:
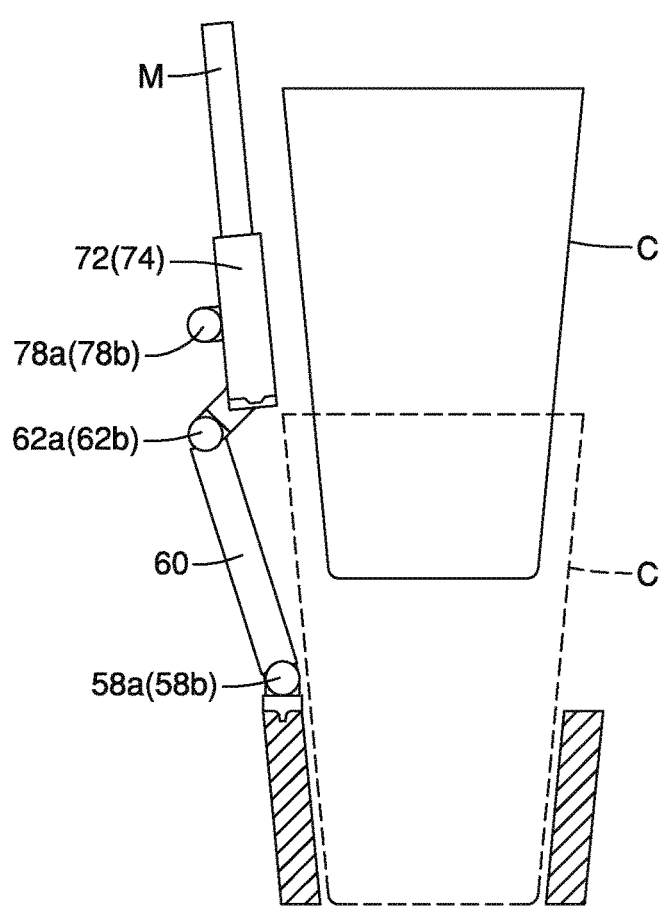
FIG. 16 is a schematic part cross-sectional view of the vehicle mobile device holder assembly with the beverage container placed within the base showing the position of the mobile device relative to the beverage container in accordance with the first embodiment.
Figure 17:
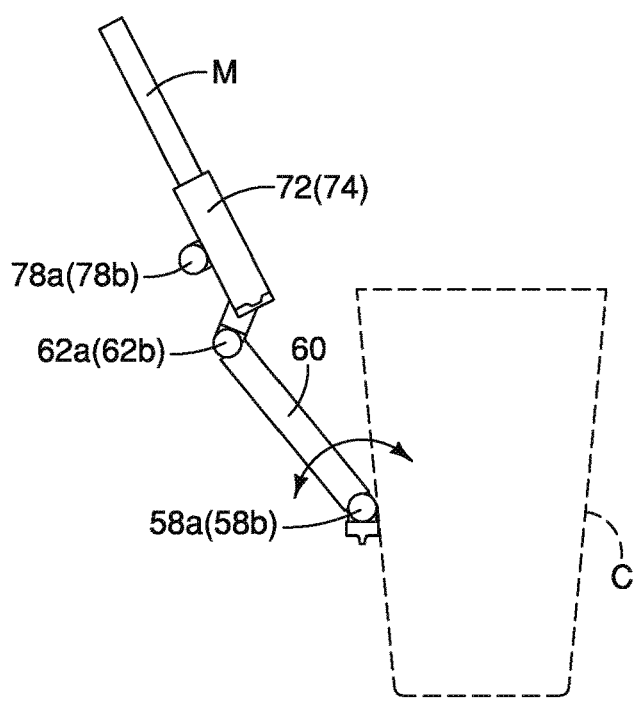
FIG. 17 is a schematic view of the vehicle mobile device holder assembly with the beverage container showing the mobile device and the second articulating section pivoted to a first orientation relative to the first articulating section where pivoting movement is about pivot pins of the first articulating section in accordance with the first embodiment.
Figure 18:
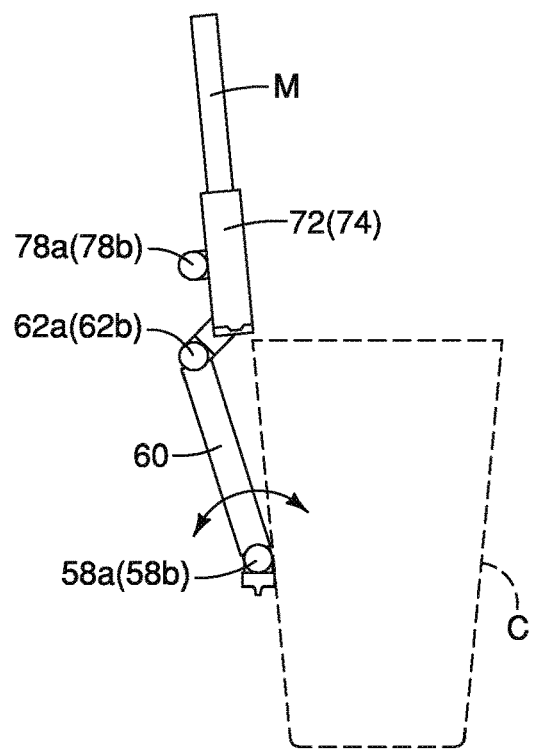
FIG. 18 is another schematic view of the vehicle mobile device holder assembly with the beverage container showing the mobile device and the second articulating section pivoted to a second orientation relative to the first articulating section where pivoting movement is about pivot pins of the first articulating section in accordance with the first embodiment.

As shown in FIGS. 6, 7 and 9, the second articulating section 32 is an elongated member that includes projections at each of its two ends. The lower end of the second articulating section 32 attaches to the upper end 56a of the first articulating section 30 via the fasteners 58a and 58b. Specifically, the fasteners 58a and 58b extend through openings in the projections of the lower end of the second articulating section 32 and thread into the horizontal openings in the upper end 56a of the first articulating section 30. With the fasteners 58a and 58b being securely tightened, sufficient force is present such that the second articulating section 32 can be pivoted about a horizontal axis defined by the fasteners 58a and 58b, as shown in FIGS. 16-18. Due to the force acting on the lower end of the second articulating section 32 by the fasteners 58a and 58b, the second articulating section 32, once pivoted, remains in place relative to the upper end 56a of the first articulating section 30.

The upper end of the second articulating section 32 is attached to the mobile device retaining section 34 via fasteners 62a and 62b, as is described in further detail below.

Figure 19:
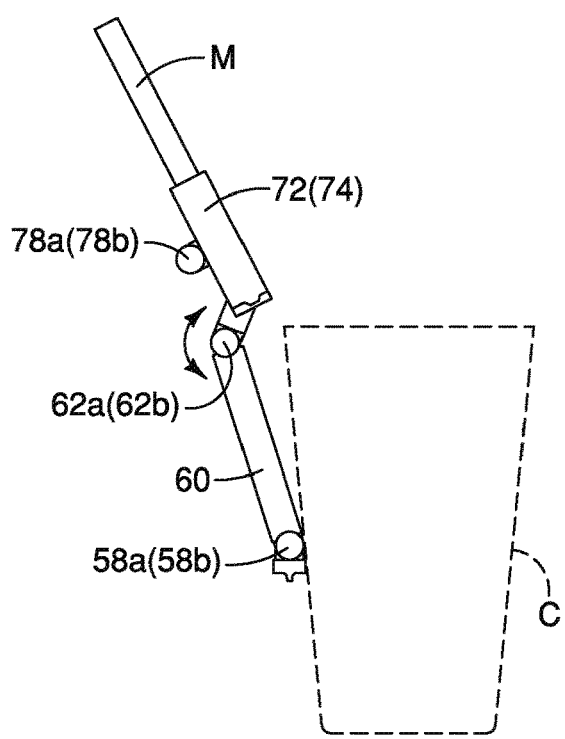
FIG. 19 is a schematic view of the vehicle mobile device holder assembly with the beverage container showing the mobile device and the mobile device retaining section pivoted to a third orientation relative to the second articulating section where the pivoting movement is about pivot pins of the second articulating section in accordance with the first embodiment.
Figure 20:
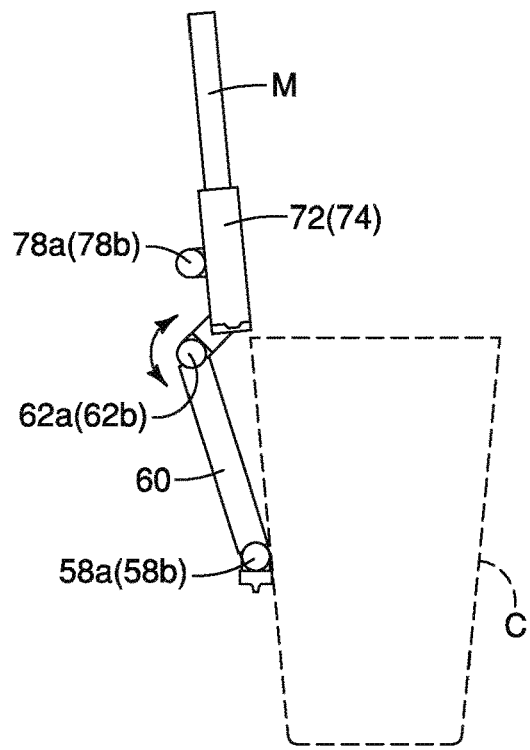
FIG. 20 is a schematic view of the vehicle mobile device holder assembly with the beverage container showing the mobile device and the mobile device retaining section pivoted to a fourth orientation relative to the second articulating section where the pivoting movement is about pivot pins of the second articulating section in accordance with the first embodiment.
Figure 21:
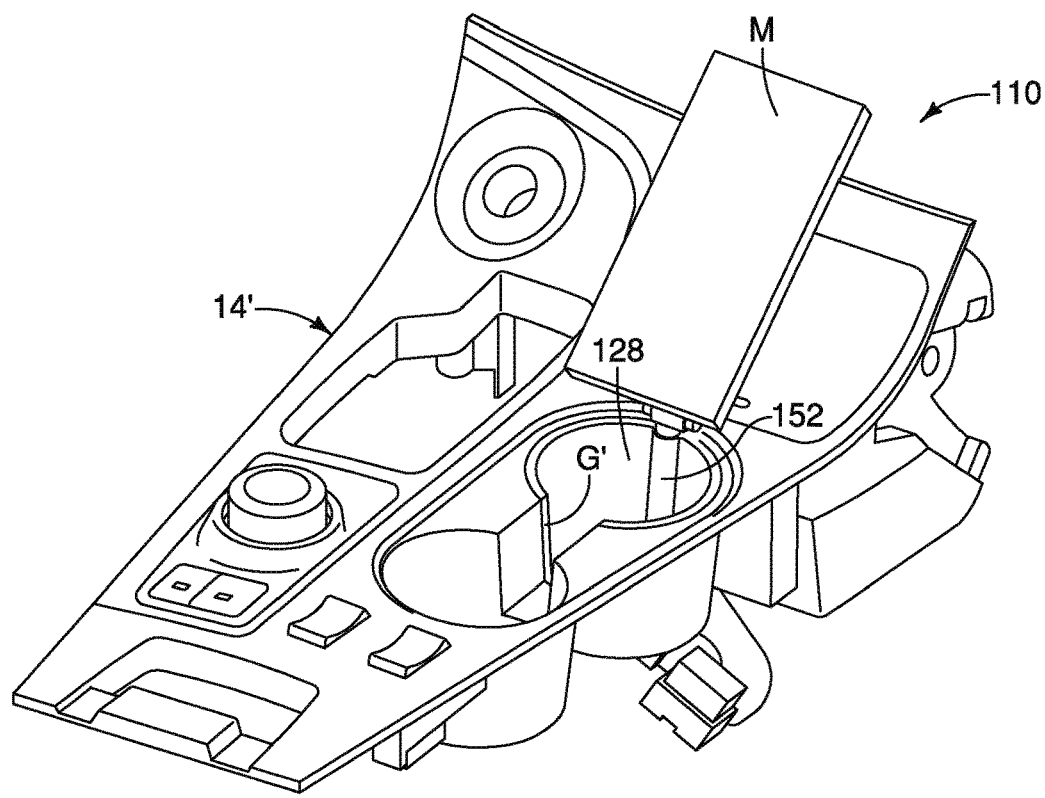
FIG. 21 is a perspective view of a center console and a vehicle mobile device holder assembly in accordance with a second embodiment.

As shown in FIGS. 6-7, 10-20, the mobile device retaining section 34 includes a panel 70, a first clamping part 72 and a second clamping part 74. The panel 70 further includes an attachment end 76 that attaches to the upper end of the second articulating section 32 via the fasteners 62a and 62b. The fasteners 62a and 62b tighten the attachment end 76 of the panel 70 such that the panel 70 can pivot about a horizontal axis defined by the fasteners 62a and 62b, as shown in FIGS. 19 and 20. However, the force applied by the fasteners 62a and 62b is sufficient to maintain the panel 70 in whatever orientation the panel 70 is moved to relative to the upper end of the second articulating section 32.

The first clamping part 72 and the second clamping part 74 are dimensioned and shaped to clamp a mobile device M (for example, a cell phone) in position against the panel 70. The panel 70 includes a recess 80 along a lower lip thereof. Each of the first clamping part 72 and the second clamping part 74 includes an alignment slider that fits into the recess 80 to ensure linear movement of each of the first clamping part 72 and the second clamping part 74 relative to the panel 70. The first clamping part 72 and the second clamping part 74 are connected to the panel via pins or fasteners 78a & 78b. The first clamping part 72, the second clamping part 74 and the fasteners 78a and 78b together define a tightening mechanism. Specifically, the tightening mechanism is configured to move the first clamping part 72 and the second clamping part 74 toward and away from one another in order to clamp and release the mobile device M relative to the panel 70.

The fasteners 78a and 78b thread into threaded openings along the backside of the panel 70. Each of the fasteners 78a and 78b include an annular lip (not shown) received in respective recesses (not shown) formed in the first clamping part 72 and the second clamping part 74 that prevent movement between the fasteners 78a and 78b and first clamping part 72 and the second clamping part 74. Consequently, rotation of each of the fasteners 78a and 78b causes corresponding movement of the corresponding one of the first clamping part 72 and the second clamping part 74 relative to the panel 70 making it possible to clamp the mobile device M in position against the panel 70.

As shown in FIGS. 5, 13 and 16 the base 28 defines the open central area A dimension and shaped to receive the beverage container C. It should be understood from the drawings and the description herein that the base 28 can have any of a variety of shapes and contours and is not limited to the shape and configuration of the base 28 of the first embodiment. In the subsequently presented embodiments, each alternative embodiment of the base includes the open central area. A dimension and shaped to receive the beverage container C.

As shown in FIGS. 16-20, the dimensions of the various elements of the holder assembly 10 are such that with most standard size cups or beverage containers, the mobile device M can be positioned above the top of the beverage container C such that the screen of the mobile device M is unhindered and fully visible to a passenger or driver of the vehicle.

Figure 15:
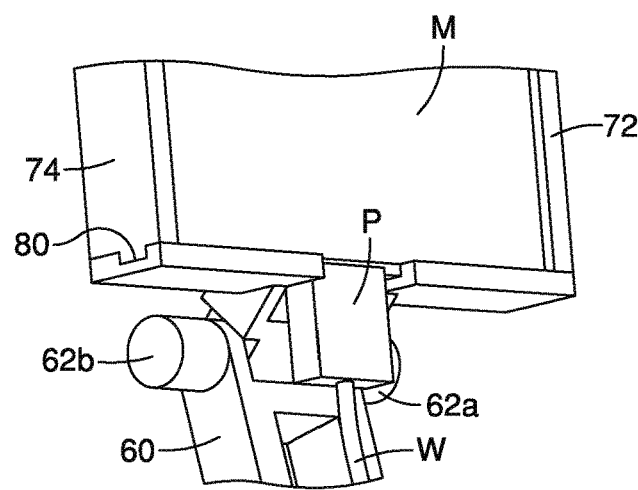
FIG. 15 is a perspective view of the first and second articulating sections and the mobile device retaining section showing a charging plug and wire extending therefrom installed to a mobile device retained within the mobile device retaining section in accordance with the first embodiment.

Further, the beam 60 of the second articulating section 32 includes two parallel portions with a gap therebetween. Hence, as shown in FIGS. 7 and 15, a charging plug P can be easily installed to the mobile device M and a cable extending from the charging plug P can extend through the gap between the two parallel portions of the beam 60.

SECOND EMBODIMENT

Referring now to FIGS. 21-36, a holder assembly 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The holder assembly 110 includes a base 128, the first articulating section 30 (with pin 56, upper end 56a and fasteners 58a and 58b), the second articulating section 32 (with beam 60 and pins or fasteners 62a and 62b) and a mobile device retaining section 134. The first articulating section 30 (with pin 56, upper end 56a and fasteners 58a and 58b) and the second articulating section 32 (with beam 60 and pins or fasteners 62a and 62b) are as described in the first embodiment. Therefore, further description of the first articulating section 30 and the second articulating section 32 is omitted for the sake of brevity.

Figure 22:
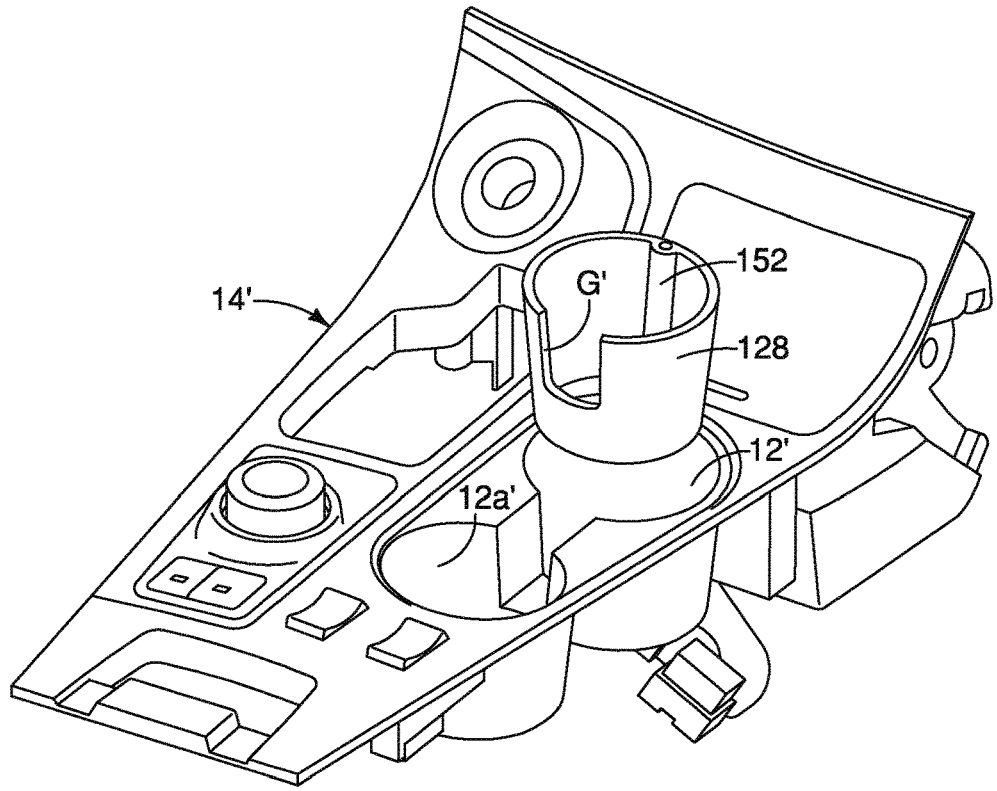
FIG. 22 is an exploded perspective view, similar to FIG. 21, showing features a base of the vehicle mobile device holder assembly in accordance with the second embodiment.
Figure 23:
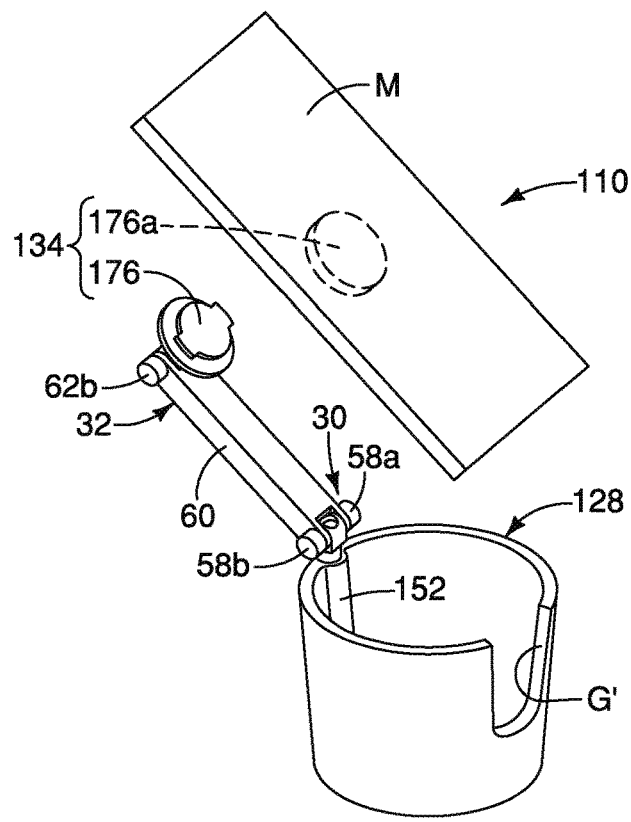
FIG. 23 is an exploded perspective view of the vehicle mobile device holder assembly showing the first articulating section installed to the base, the second articulating section installed to the first articulating section with a mobile device retaining section installed to the second articulating section in accordance with the second embodiment.
Figure 24:
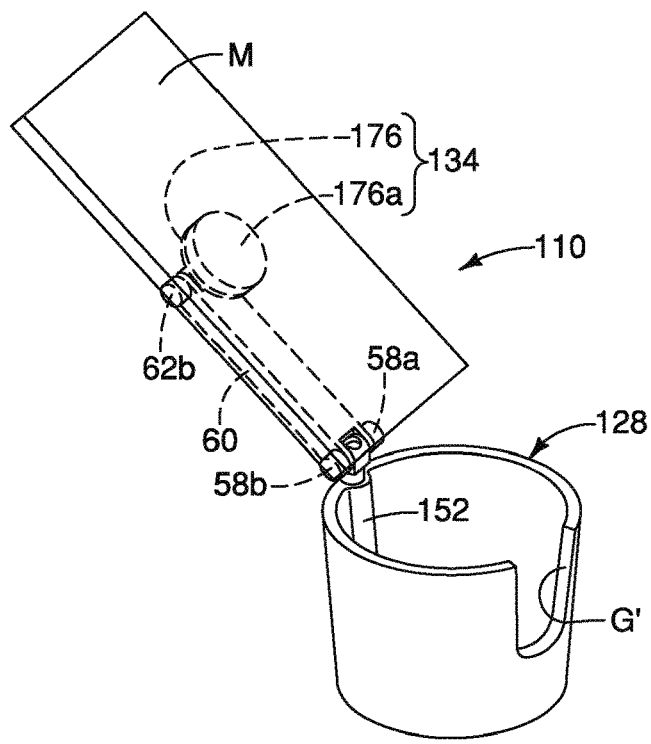
FIG. 24 is a perspective view of the vehicle mobile device holder assembly showing the first articulating section installed to the base, the second articulating section installed to the first articulating section with the mobile device retaining section and mobile device in accordance with the second embodiment.
Figure 25:
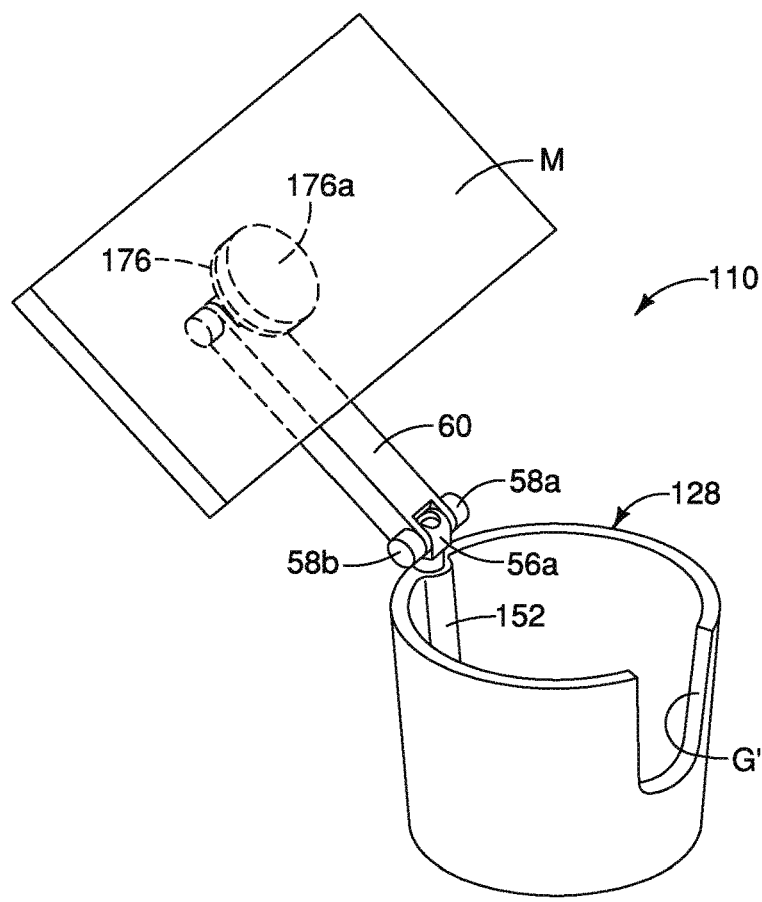
FIG. 25 is a perspective view of the vehicle mobile device holder assembly showing the mobile device rotated 90 degrees relative to the second articulating structure such that the mobile device retaining section is oriented to secure the mobile device in place in accordance with the second embodiment.
Figure 26:
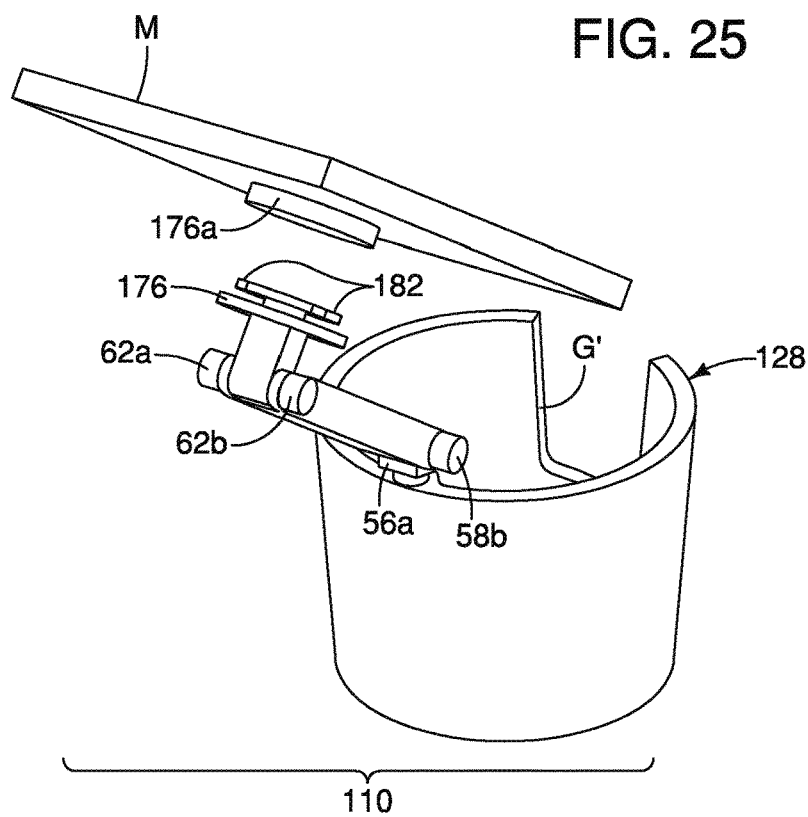
FIG. 26 is a perspective view of the vehicle mobile device holder assembly showing a first attachment structure and a second attachment structure of the mobile device retaining section and further showing the mobile device and the second attachment structure released from the first attachment structure of mobile device retaining section in accordance with the second embodiment.
Figure 27:
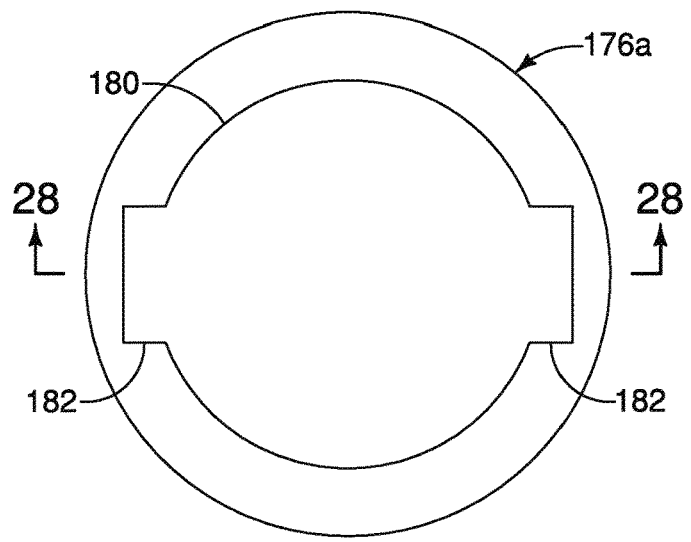
FIG. 27 is a top view of the first attachment structure of the mobile device retaining section showing a pair of projections in accordance with the second embodiment.
Figure 28:
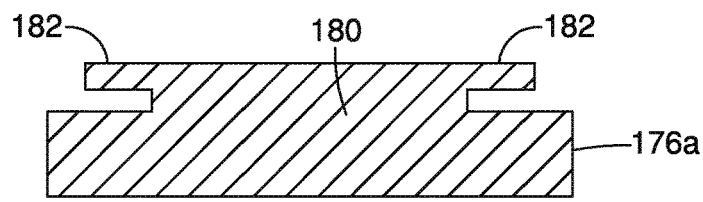
FIG. 28 is a cross-section view of the first attachment structure of the mobile device retaining section taken along the lines 28-28 in FIG. 27 showing the pair of projections in accordance with the second embodiment.
Figure 29:
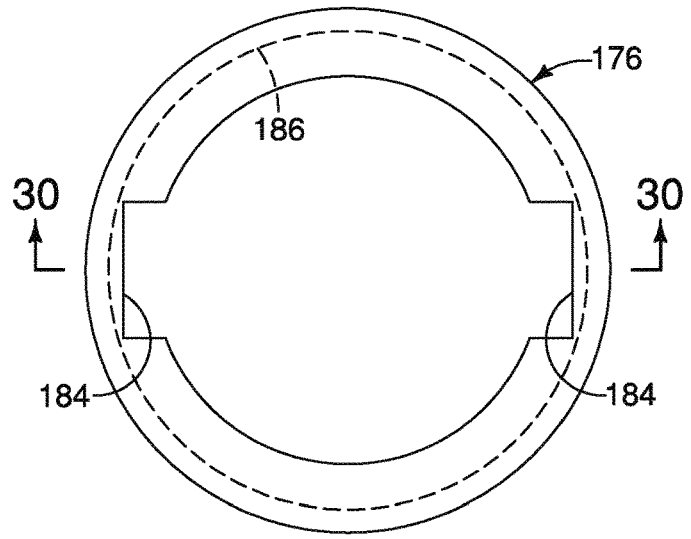
FIG. 29 is a bottom view of the second attachment structure of the mobile device retaining section showing a pair of recesses in accordance with the second embodiment.
Figure 30:
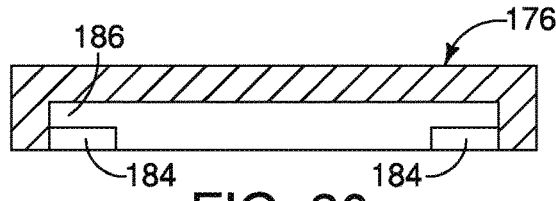
FIG. 30 is a cross-section view of the second attachment structure of the mobile device retaining section taken along the lines 30-30 in FIG. 29 showing the pair of recesses in accordance with the second embodiment.

As shown in FIG. 22, the base 128 has a tapered cylindrical shape or conical shape that conforms with a corresponding tapered cylindrical shape or conical shape of a beverage container recess 12' of a vehicle center console 14'. The base 128 is formed with a gap G that conforms in size and shape with a similar gap defined between the beverage container recess 12' and a beverage container recess 12a' of the vehicle center console 14'.

The base 128 has basically the same function as the base 128 of the first embodiment in that it fits within the beverage container recess 12' and holds the holder assembly 110 in position. The base 128 is further shaped and configured so that a beverage container can fit within the base 128, as described above with reference to the first embodiment.

The base 128 includes an attachment portion 152 that basically has the same function as the attachment portion 52 of the first embodiment that receives the pin 56 of the first articulating section 30. However, in the second embodiment, with the base 128 located within the beverage container recess 12', the attachment portion 152 is in a forward and centered location relative to the beverage container recess 12' of the center console 14. The base 128 further includes a gap' that extends from the upper edge of the base 128 to an area that is approximately two thirds (⅔) of the overall height of the base 128. In other words, the gap G' has an overall U-shape.

The mobile device retaining section 134 replaces the mobile device retaining section 34 of the first embodiment. As is clear from the description below, the mobile device retaining section 134 can replace the mobile device retaining section 34 of the first embodiment and is not limited to use in the holder assembly 110 of the second embodiment.

Figure 31:
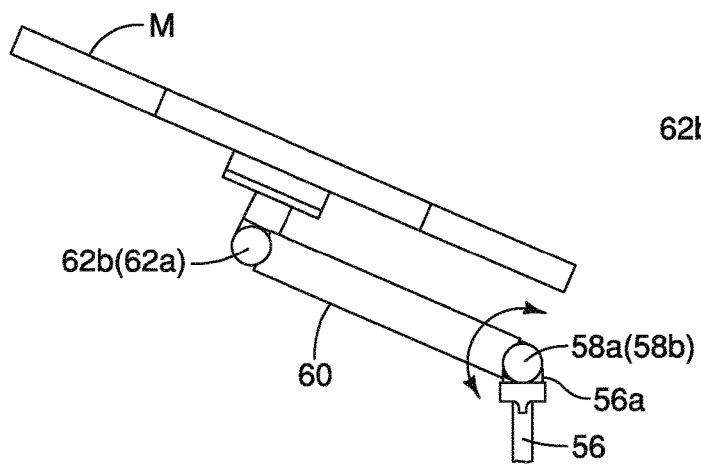
FIG. 31 is a schematic view of the vehicle mobile device holder assembly showing the mobile device and the second articulating section pivoted to a first orientation relative to the first articulating section where pivoting movement is about pivot pins of the first articulating section in accordance with the second embodiment.
Figure 32:
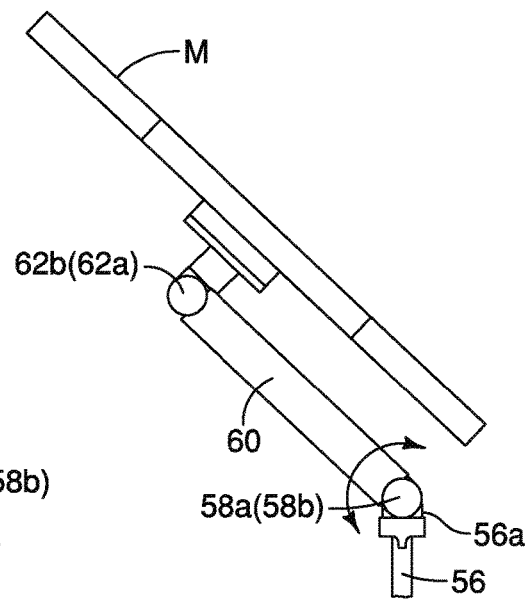
FIG. 32 is another schematic view of the vehicle mobile device holder assembly showing the mobile device and the second articulating section pivoted to a second orientation relative to the first articulating section where pivoting movement is about pivot pins of the first articulating section in accordance with the second embodiment.
Figure 33:
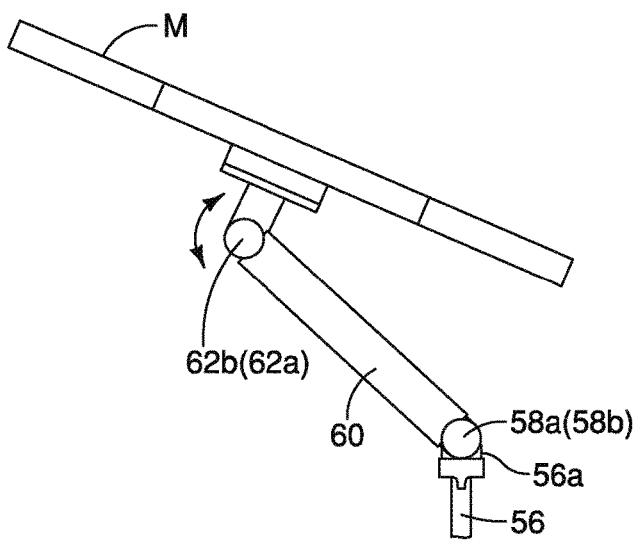
FIG. 33 is a schematic view of the vehicle mobile device holder assembly showing the mobile device and the mobile device retaining section pivoted to a third orientation relative to the second articulating section where the pivoting movement is about pivot pins of the second articulating section in accordance with the second embodiment.
Figure 34:
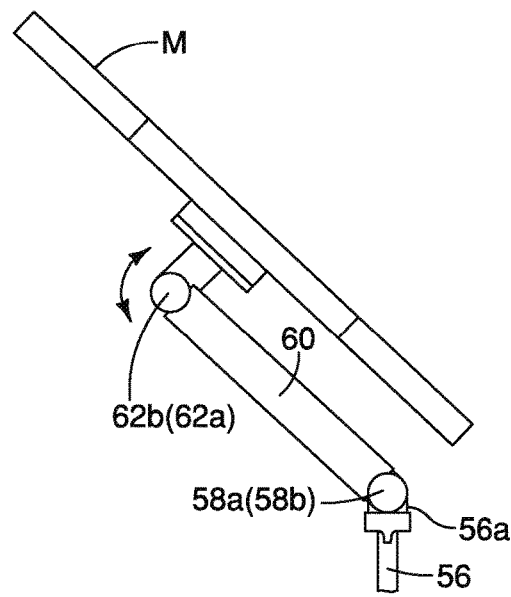
FIG. 34 is a schematic view of the vehicle mobile device holder assembly showing the mobile device and the mobile device retaining section pivoted to a fourth orientation relative to the second articulating section where the pivoting movement is about pivot pins of the second articulating section in accordance with the first embodiment.
Figure 35:
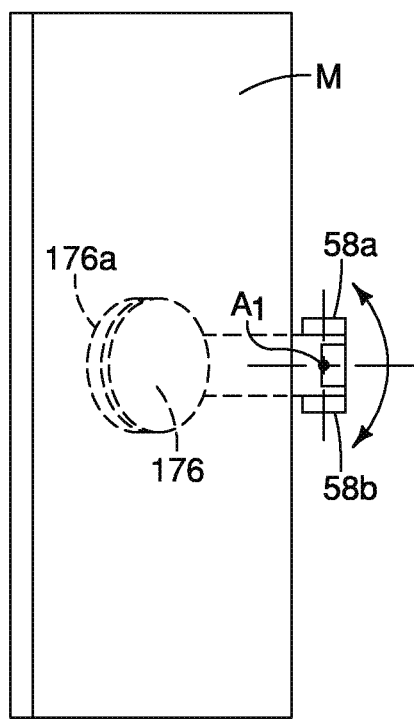
FIG. 35 is a top schematic view showing the second articulating section pivoted to a first position with pivoting movement being about an upright axis defined by the first articulating section in accordance with the second embodiment.
Figure 36:
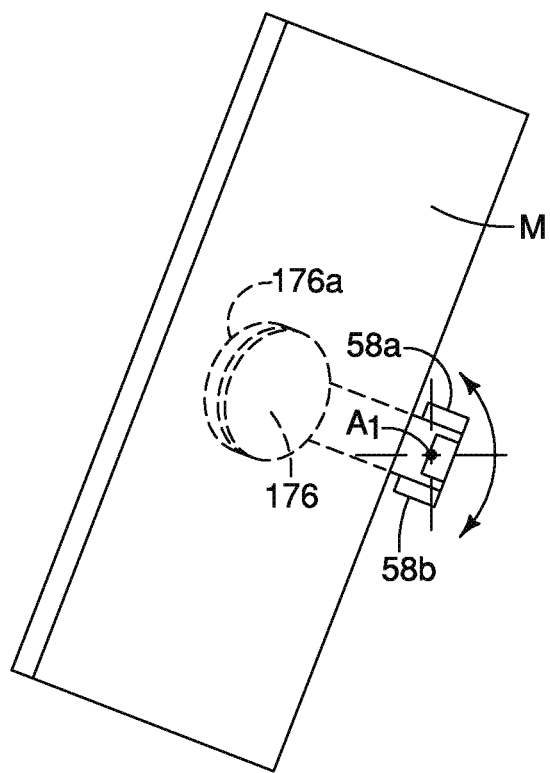
FIG. 36 is a top schematic view showing the second articulating section pivoted to a second position with pivoting movement being about an upright axis defined by the first articulating section in accordance with the second embodiment.

The mobile device retaining section 134 includes a first attachment structure 176 and a second attachment structure 176a. The first attachment structure 176 is pivotally attached to the upper end of the beam 60 via the pins or fasteners 62a and 62b such that the first attachment structure 176 can be pivoted about the horizontal axis defined by the fasteners 62a and 62b, as shown in FIGS. 33 and 34. Similarly, the beam 60 can be pivoted about the horizontal axis defined by the fasteners 58a and 58b, as shown in FIGS. 31 and 32. Further, as shown in FIGS. 35 and 36, the beam 60 and upper end 56a of the first articulating section 30 can be pivoted about the vertical axis $A_1$ defined by the pin 56.

The first attachment structure 176 has a first portion with disc-like shape and a second portion that includes a pair of projections 182 (FIGS. 26-28) that extend away from one another and are spaced apart from the first portion. The second attachment structure 176a has a first side that attaches to a mobile device M via, for example, an adhesive material) and a second side that defines a pair of slots 184 open to an annular recessed area 186. The gaps or slots 184 are shaped and dimensioned to receive the pair of projections 182 of the first attachment structure 176 such that the second attachment structure 176a can be releasably retained to the first attachment structure 176. More specifically, the projections 182 can be inserted through the slots 184 and into the annular recessed area 186. Thereafter, the second attachment structure 176a and the mobile device NI can be rotated 90 degrees relative to the first attachment structure 176, retaining the second attachment structure 176a and the mobile device M to the second articulating section 32.

THIRD EMBODIMENT

Figure 37:
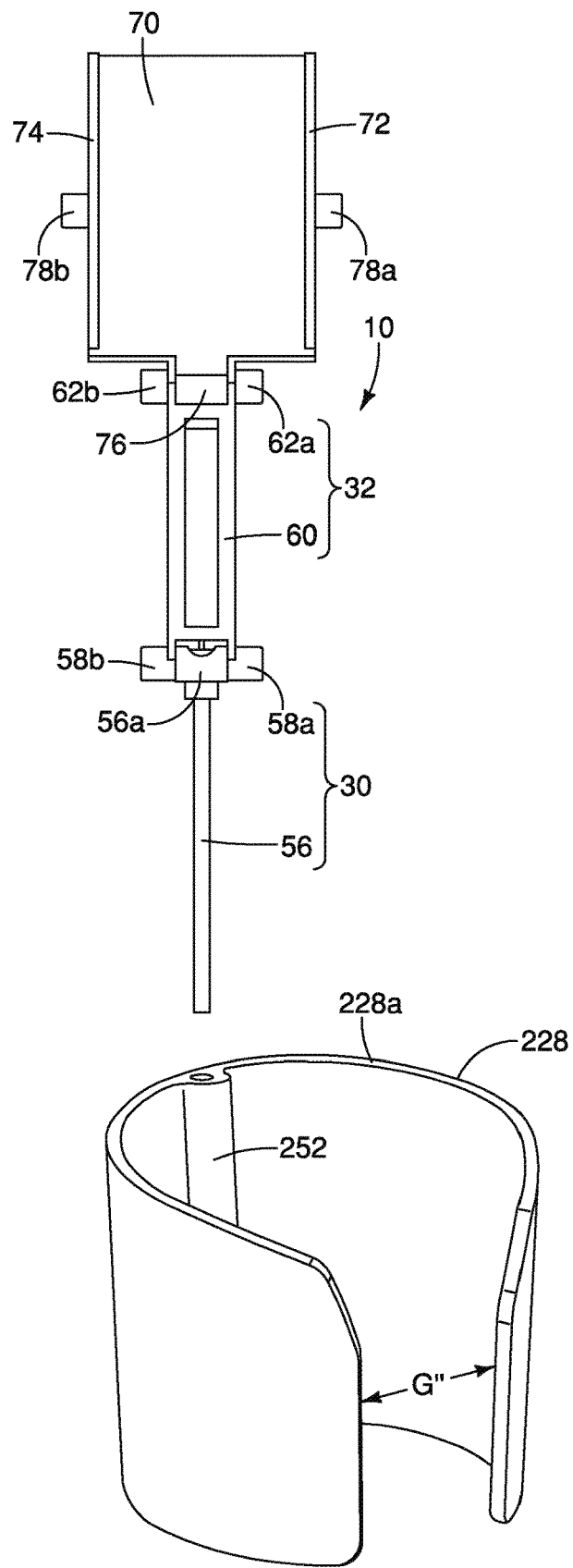
FIG. 37 is an exploded perspective view of a vehicle mobile device holder assembly showing a base in accordance with a third embodiment.

Referring now to FIG. 37, a base 228 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

The base 228 is shown with the holder assembly 10 (with the base 28 being replaced by the base 228). The base 228 has a cylindrical shape with a gap G" that has upper edges that diverge away from one another extending upward.

FOURTH EMBODIMENT

Figure 38:
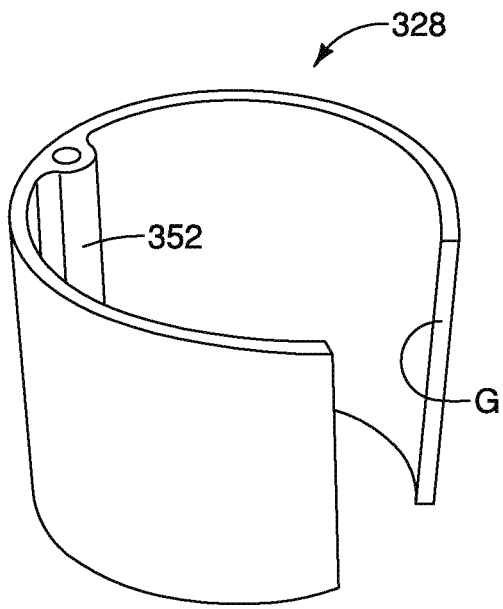
FIG. 38 is a perspective view of a base of a vehicle mobile device holder assembly in accordance with a fourth embodiment.

Referring now to FIG. 38, a base 328 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The base 328 is similar to the base 128 of the second embodiment in that the base 328 is cylindrically or conically shaped and further includes an attachment portion 352. However, the base 328 further includes a gap G that extends the entire height of the base 328.

FIFTH EMBODIMENT

Figure 39:
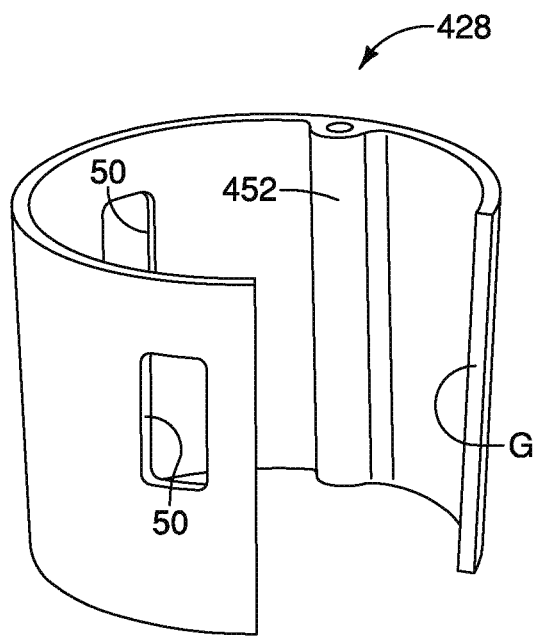
FIG. 39 is a perspective view of a base of a vehicle mobile device holder assembly in accordance with a fifth embodiment.

Referring now to FIG. 39, a base 428 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The base 428 is similar to the base 128 of the second embodiment and the base 328 of the fourth embodiment in that the base 428 is cylindrically or conically shaped. However, in the fifth embodiment, an attachment portion 452 of the fifth embodiment is formed with the base 428 at a location that is off-center, similar to the attachment portion 52 of the first embodiment.

SIXTH EMBODIMENT

Figure 40:
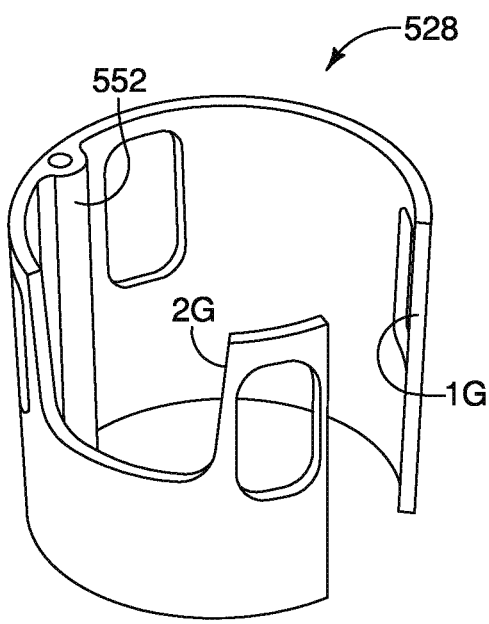
FIG. 40 is a perspective view of a base of a vehicle mobile device holder assembly in accordance with a sixth embodiment.

Referring now to FIG. 40, a base 528 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The base 528 is similar to the base 128 of the second embodiment and the base 328 of the fourth embodiment in that the base 428 is cylindrically or conically shaped. However, in the sixth embodiment, the base 528 includes a first gap 1G that extends the entire height of the base 528 and a second gap 2G that only extends about half way down from the upper edge of the base 528, thereby defining a gap that has an overall U-shape.

Although not shown, some center consoles include side-by-side beverage recesses. The second gap 2G of the base 528 can be shaped and dimensioned to correspond to an open space between side-by-side beverage recesses.

SEVENTH EMBODIMENT

Figure 41:
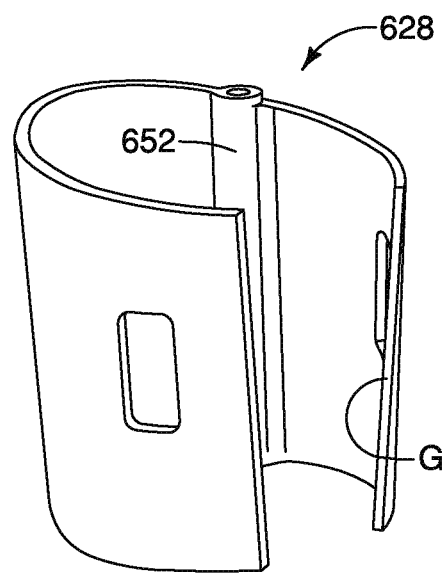
FIG. 41 is a perspective view of a base of a vehicle mobile device holder assembly in accordance with a seventh embodiment.

Referring now to FIG. 41, a base 628 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

The base 628 is similar to the base 128 of the second embodiment and the base 328 of the fourth embodiment in that the base 428 is cylindrically or conically shaped. However, in the seventh embodiment, the base 628 has an attachment portion 652 that is off center in a manner similar to the attachment portion 52 of the first embodiment. Further, an upper edge of the base 628 tapers downward from front to back. In other words the front end of the base 628 is taller than a rearward end thereof proximate the gap G.

EIGHTH EMBODIMENT

Figure 42:
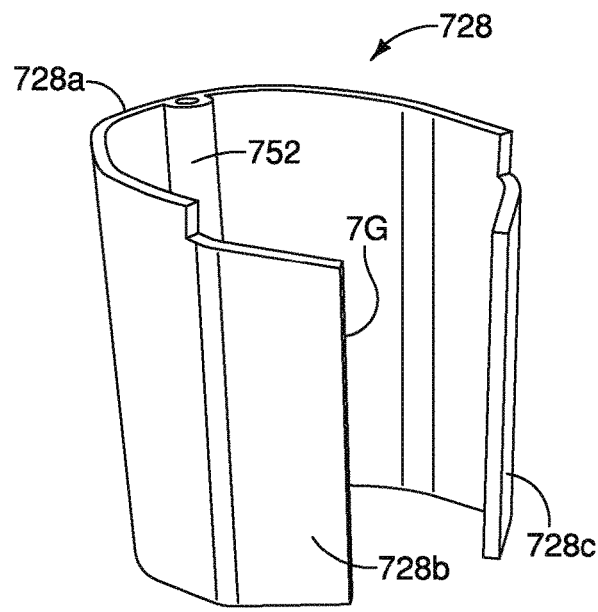
FIG. 42 is a perspective view of a base of a vehicle mobile device holder assembly in accordance with an eighth embodiment.

Referring now to FIG. 42, a base 728 in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

The base 728 has a forward section 728a that has a semi-circular shape along an upper edge thereof, and include two wall sections 728a and 728b that are not curved. Further the two wall sections 728a and 728b extend toward each other but define a gap 7G therebetween. Further, the forward section 728a has a first overall height. The two wall sections 728a and 728b define a second height at their respective intersections with the forward section 728a, the second height being less than the first overall height. More specifically, the two wall sections 728a and 728b define a step down at their respective intersections with the forward section 728a.

NINETH EMBODIMENT

Figure 43:
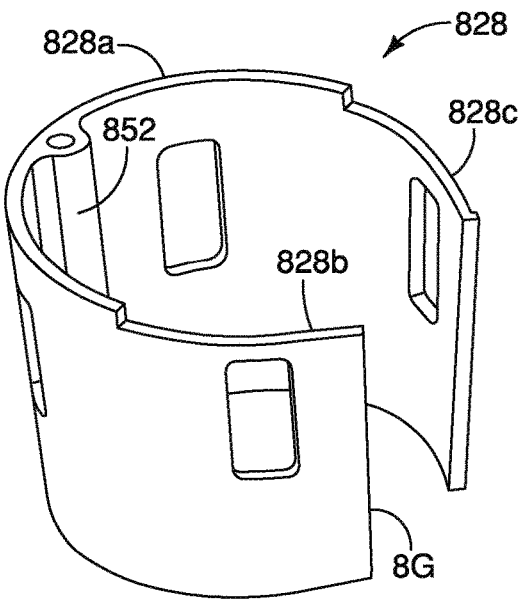
FIG. 43 is a perspective view of a base of a vehicle mobile device holder assembly in accordance with a nineth embodiment.

Referring now to FIG. 43, a base 828 in accordance with a nineth embodiment will now be explained. In view of the similarity between the first and nineth embodiments, the parts of the nineth embodiment that are identical to the parts of the first embodiment will be given the same reference numerals as the parts of the first embodiment. Moreover, the descriptions of the parts of the nineth embodiment that are identical to the parts of the first embodiment may be omitted for the sake of brevity.

The base 828 has a has a semi-circular or conical shape. The base 828 includes an attachment section 852 that is centered when installed to a center console. The base 828 defines an upper edge that includes a semi-circular edge portion 828a, second portion 828b and a third portion 828c. The edge portion 828a has a first overall height. The second and third portions 828b and 828c have a second overall height that is less than the first overall height, thereby defining step down portions of the upper edge of the base 828.

TENTH EMBODIMENT

Figure 44:
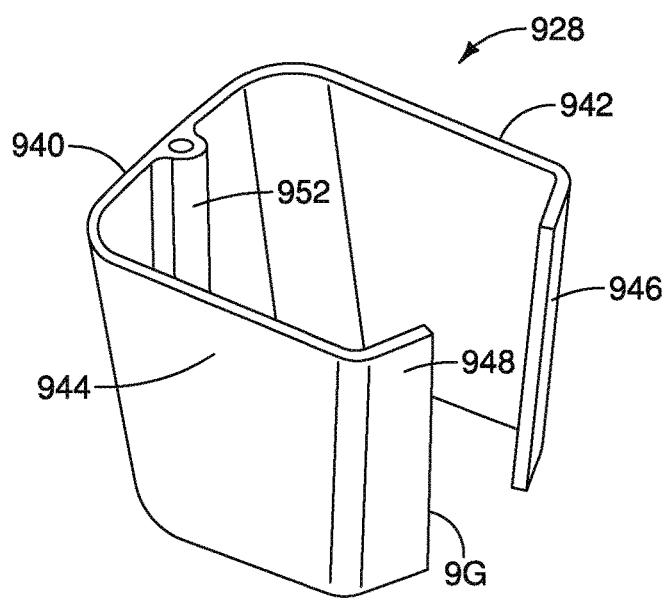
FIG. 44 is a perspective view of a base of a vehicle mobile device holder assembly in accordance with a tenth embodiment.

Referring now to FIG. 44, a base 928 in accordance with a tenth embodiment will now be explained. In view of the similarity between the first and tenth embodiments, the parts of the tenth embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

The base 928 includes has a first upright wall section 940, a second upright wall section 942 and a third upright wall section 944, a fourth upright wall section 946 and a fifth upright wall section 948. The first and second upright wall sections 940 and 942 are approximately perpendicular to one another (plus or minus any value between 1 and 15 degrees), and, the first and third upright wall sections 940 and 944 are approximately perpendicular to one another (plus or minus any value between 1 and 15 degrees).

Further, the second and third upright wall sections 942 and 944 are approximately parallel to one another (plus or minus any value between 1 and 30 degrees).

The fourth upright wall section 946 extends away from the second upright wall section 942 defining an obtuse angle therebetween. Similarly, the fifth upright wall section 948 extends away from the third upright wall section 944 defining an obtuse angle therebetween. Further, the fourth and fifth upright wall sections 946 and 948 extend in directions that converge toward one another. As well, the fourth upright wall section 946 and the fifth upright wall section 948 define a gap 9G therebetween such that with the base 928 installed within the beverage container recess 12 of a center console 14 of a passenger vehicle, the gap 9G is located at a rearward portion of the beverage container recess 12. However, if the base 928 is installed within the beverage container recess 12a of a center console 14, the gap 9G would be located at a forward portion of the beverage container recess 12a due to the shape and configuration of the beverage container recess 12a relative to the beverage container recess 12.

The base 928 further includes an attachment portion 952 that is centered on the first upright wall section 940. The attachment portion 952 is configured to receive the pin 56 thereby supporting the remainder of the holder assembly 10 (not shown in FIG. 44)

The center console assembly 14 and related features thereof are conventional components that are well known in the art. Since such features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle mobile device holder assembly. Accordingly, these terms, as utilized to describe the present invention should be interpreted relative to a vehicle equipped with the vehicle mobile device holder assembly.

The term "configured" as used herein to describe an element, assembly, component, section or part of a structure that is dimensioned and constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle mobile device holder assembly, comprising:
   a center console assembly of a passenger vehicle having
      a beverage container recess that includes a plurality of upright wall sections, at least one of the upright wall sections having a spring-loaded member that extends into the beverage container recess and is movable by compression forces into a pocket within the at least one of the upright wall sections;
   a base shaped and dimensioned to fit within the beverage container recess in the center console, the base having an open central area dimensioned and shaped to receive a beverage container, the base further including an attachment portion, the base having a first upright wall section, a second upright wall section, a third upright wall section, a fourth upright wall section and a fifth upright wall section, the first and second upright wall sections being approximately perpendicular to one another and the first and third upright wall sections being approximately perpendicular to one another, the fourth upright wall section extending from the second upright wall section defining an obtuse angle therebetween, and, the fifth upright wall section extending from the third upright wall section defining an obtuse angle therebetween, respective upright edges of the fourth upright wall section and the fifth upright wall section define a gap therebetween, the attachment portion being located at an intersection of the first upright wall section and the second upright wall section, at least one of the first, second, third, fourth and fifth upright wall sections has an opening that is shaped, dimensioned and positioned to receive the spring-loaded member of the beverage container recess such that the spring-loaded member retains the base within the beverage container recess;
   a first articulating section attached to the attachment portion of the base; and
   a second articulating section attached to the first articulating section, the second articulating section having a mobile device retaining section.

2. The vehicle mobile device holder assembly according to claim 1, wherein
   the attachment portion of the base includes an upright extending opening, and
   the first articulating section includes an elongated pin inserted into the upright extending opening such that the elongated pin and the first articulating section pivot relative to the attachment portion about an upright axis.

3. The vehicle mobile device holder assembly according to claim 2, wherein
   the first articulating section includes a pivot structure attached to an upper end of the elongated pin such that the first articulating section pivots about a horizontal axis defined by the pivot structure.

4. The vehicle mobile device holder assembly according to claim 1, wherein the mobile device retaining section includes a pair of clamping members and a tightening mechanism configured to move the pair of clamping members toward and away from one another.

5. The vehicle mobile device holder assembly according to claim 1, wherein
the mobile device retaining section includes a first member attached to the first articulating section for pivotal movement about a horizontal axis.

6. The vehicle mobile device holder assembly according to claim 5, wherein
the first member of the mobile device retaining section includes a first attachment structure having a pair of projections that extend away from one another, and
a second attachment structure having a first side that attaches to a mobile device and a second side defining a recessed area shaped and dimensioned to receive the pair of projections of the first attachment structure such that the second attachment structure is releasably retained to the first attachment structure.

7. The vehicle mobile device holder assembly according to claim 1, wherein
the base has an upper edge with the entirety of the upper edge defining a single plane.

8. The vehicle mobile device holder assembly according to claim 1, wherein
the base has a first upper edge section and a second upper edge section with the entirety of the first upper edge section defining a first plane and the second upper edge section defining a second plane that is spaced apart from the first plane.

9. The vehicle mobile device holder assembly according to claim 1, wherein
the beverage container recess of the center console assembly includes a second spring-loaded member that extends into the beverage container recess and is movable by compression forces into a second pocket within another of the upright wall sections;
another of the first, second, third, fourth and fifth upright wall sections has a second opening that is shaped, dimensioned and positioned to receive the second spring-loaded member of the beverage container recess such that the second spring-loaded member also retains the base within the beverage container recess.

* * * * *